United States Patent [19]
Hauschulz et al.

[11] Patent Number: 5,714,738
[45] Date of Patent: Feb. 3, 1998

[54] APPARATUS AND METHODS OF MAKING AND USING HEATER APPARATUS FOR HEATING AN OBJECT HAVING TWO-DIMENSIONAL OR THREE-DIMENSIONAL CURVATURE

[75] Inventors: Dana S. Hauschulz, Boulder, Colo.; Daniel E. Hilton, Maryland Heights, Mo.

[73] Assignees: Watlow Electric Manufacturing Co., St. Louis, Mo.; MKS Instruments, Inc., Andover, Mass.

[21] Appl. No.: 500,745

[22] Filed: Jul. 10, 1995

[51] Int. Cl.$^6$ ................... H05B 3/58; B29B 7/00
[52] U.S. Cl. ............... 219/535; 219/528; 219/544; 219/549; 138/33; 264/171.24; 264/299; 264/328.1
[58] Field of Search .................. 219/534–535, 219/528, 544, 549; 264/171.24, 146, 297.2, 297.5, 299, 328.1, 454; 29/611; 138/33

[56] References Cited

U.S. PATENT DOCUMENTS

| | | |
|---|---|---|
| 2,531,958 | 11/1950 | Williams, Jr. et al. |
| 3,331,946 | 7/1967 | Bilbro . |
| 3,535,494 | 10/1970 | Armbruster .............. 219/528 |
| 3,547,725 | 12/1970 | Shomphe et al. .......... 219/528 |
| 3,807,458 | 4/1974 | Royston . |
| 3,853,443 | 12/1974 | Grillos . |
| 3,876,355 | 4/1975 | Baughmann . |
| 3,900,654 | 8/1975 | Stinger .............. 428/214 |
| 4,281,238 | 7/1981 | Noma et al. .......... 219/535 |
| 4,329,569 | 5/1982 | Hjortsberg et al. ....... 219/535 |
| 4,384,905 | 5/1983 | Gros . |
| 4,429,213 | 1/1984 | Mathieu ............ 392/468 |
| 4,447,377 | 5/1984 | Denton . |
| 4,523,141 | 6/1985 | Thomas et al. ........ 324/557 |
| 4,549,069 | 10/1985 | Oge ................ 219/204 |
| 4,558,210 | 12/1985 | Leary . |
| 4,925,605 | 5/1990 | Petronko . |
| 4,930,543 | 6/1990 | Zuiches . |
| 5,236,765 | 8/1993 | Cordia et al. . |
| 5,286,952 | 2/1994 | McMills et al. . |

OTHER PUBLICATIONS

"Heated Pumping Lines," *VacuComp* HPS Division MKS Instruments, Inc., Series 43 (Apr. 1994).

"Silicone Rubber Heaters Offer Imaginative Solutions to Design Problems," Jim Ebert, Lonny Aylsworth, Ray McBee, Watlow Electric Mfg. Co., Reprinted from Design News, Oct. 22, 1984.

Descriptions of Seven Prior Art Products.

*Primary Examiner*—Teresa J. Walberg
*Assistant Examiner*—Raphael Valencia
*Attorney, Agent, or Firm*—James R. Young; Scott B. Allison; Chrisman, Bynum & Johnson, P.C.

[57] ABSTRACT

The flexible insulated heater includes a heater mat surrounded by an insulation jacket. The heater mat is preferably made of two layers of fiberglass reinforced rubber sheets laminated together with resistive heater wires sandwiched between the laminated sheets. The heater mat is formed with a curvature and size to fit snugly around the peripheral surface of the pipe that is to be heated. A jacket of thermally insulative material, such as a polymer foam, is molded over the external surface of the heater mat. The insulated jacket holds the heat generated by the heater mat from escaping radially outward, and it protects against burns to persons who might touch the heater. The mat and the jacket are configured so that the heater has interfacing opposite edges and that meet and preferably touch each other when the heater is mounted on the pipe, but the combination of the mat and jacket have sufficient resilient flexibility to allow opening the heater by separating the edges enough to slip the heater over the pipe, whereupon the heater resumes its original inherent cylindrical shape when released. Snaps, Velcro™ fastening material straps, or other suitable fasteners can be used to secure the heaters snugly around the pipe, if desired, although the biased resilience of the heater to its formed shape is generally sufficient itself to hold the heater in place. A power cord, control cavity, and an optional overmold provide electric power to the heating wires or elements in the heating mat. A system of flexible insulated heaters can be daisy-chained or ganged together to heat and insulate a network of pipes.

55 Claims, 18 Drawing Sheets

APPARATUS AND METHODS OF MAKING AND USING HEATER APPARATUS FOR HEATING AN OBJECT HAVING TWO-DIMENSIONAL OR THREE-DIMENSIONAL CURVATURE

BACKGROUND OF THE INVENTION

1. Field of the Invention

This invention relates generally to a flexible insulated heater for surrounding pipes or other odd shaped components that require heating and, more particularly, to a relatively thick stretchable polymer foam insulation molded around, and bonded to, a relatively thin non-stretchable heater mat to form a composite structure for heating objects possessing either two-dimensional curvature, such as piping and other conduits, or three-dimensional curvature, such as spheres, saddles, valve bodies, elbow fittings, or T-fittings.

2. Description of the Prior Art

Heaters are often used in the semiconductor device manufacturing, chemical processing, plastics manufacturing, commercial food processing, equipment manufacturing, and other manufacturing industries to heat or insulate piping, tubing, valve bodies, and other conduits having two-dimensional or three-dimensional curvature, particularly if processing or manufacturing requires that liquids or gases be transported at specific temperatures with limited heating or cooling or to prevent solidification of vaporous materials and consequent deposition of such materials on inside surfaces of the piping, tubing, valve bodies, and other conduits. The heaters can be thermally insulated from the ambient air to reduce the amount of power required and to minimize the outside temperature of the exposed heaters so that personnel who might contact them do not become accidently burned.

For example, semiconductor manufacturing processes, such as Low Pressure Chemical Vapor Deposition (LPCVD) and aluminum etching, generate reaction byproducts, such as ammonium chloride gas ($NH_4Cl$) or aluminum chloride ($AlCl_3$) gas, in the effluent gas created in and discharged from the reaction process chamber. The ammonium chloride gas may solidify, deposit, and thereby cause a solid buildup on any cool surface, such as the inside surface of an unheated pipe conveying the gas to an exhaust or disposal site, vacuum pumps, and other equipment. This solid buildup in pipes, pumps, and other equipment downstream from the reaction process chamber can partially or even entirely plug the pipes, damage the pumps and other equipment, reduce vacuum conductance, and render piping, pumps, and other equipment used in the manufacturing process functionally impaired or inoperative. The solid buildup can also flake apart and off the piping surfaces so as to become a source of contamination in the manufacturing process. A Low Pressure Chemical Vapor Deposition (LPCVD) process for depositing a coating of silicon nitride on substrate wafers used to form semiconductor chips, for example, creates this type of solid buildup by producing large amounts of ammonium chloride gas as a byproduct in the reaction chamber where the silicon nitride deposition occurs. Ammonium chloride gas typically sublimates at a temperature of less than one hundred degrees Celsius (100° C.) at 300 millitorr. Once the ammonium chloride gas leaves the reaction chamber and cools down, sublimation of the ammonium chloride causes a white crystalline material to form and build up on all unheated surfaces, such as on the insides of pipes and pumps used in the manufacturing system. The sublimated ammonium chloride can flake, break away, and flow back into the reaction chamber, where it can contaminate the semiconductor substrate wafers in the reaction chamber. If such contamination occurs, the manufacturing system must be shut down while the crystalline material is cleaned out of the system, and the clogged pipes and pumps have to be cleaned or replaced. In addition, the substrate wafers or semiconductor chips may have become so contaminated that they are worthless and beyond repair or use. In order to prevent the ammonium chloride gas from solidifying and clogging or contaminating the manufacturing system, heaters can be placed around the piping to preclude the ammonium chloride gas from cooling, sublimating, solidifying, or condensing until it reaches an area where it can be collected effectively and efficiently.

The use of heaters and other devices to heat and/or insulate objects, including pipes in the exemplary setting described above, is well-known in the art. For example, U.S. Pat. No. 4,429,213 issued to Mathieu discloses an electrically heated fluid conduit, where the heater includes an insulated electrical conductor and a thin layer surrounded by a foam insulating layer. This invention, however, is useable only on non-metal, non-electrically conductive pipes, uses an extrusion process that is not suitable for creating heaters having a non-tubular or non-cylindrical shape or configuration, and cannot be removed after they are molded in place.

U.S. Pat. No. 4,025,605 issued to Petronko discloses a removable and reusable jacket for thermally insulating pipe accouterments. This jacket is not a heater, however, and requires a rigid outer layer during the application process. Furthermore, the resulting inner and middle layers are not easily removable and reattachable to the pipe or the accouterment.

U.S. Pat. No. 4,281,238 issued to Noma et al. discloses a removable tubular jacket for preheating a tubular fluorescent or iodine lamp in a photocopier machine to ensure instantaneous starting when the light switch is turned on. It has an electric resistive heating wire sandwiched between two layers of silicone rubber that are heat-cured on a mandrel with a curved surface that has about the same or slightly smaller diameter than the light bulb to be heated. Therefore, it has the advantage of having a formed, resilient shape that matches the surface of the light bulb to be heated. To provide sufficient mechanical strength to maintain the molded shape or form, the silicone rubber layers have to be fairly thick, and at least the outer layer of silicone rubber has to be quite hard. Noma et al., in their exemplary embodiment used two layers, each 1 mm thick for a total thickness of at least 2 mm (0.0787 in.). Thinner silicone rubber sheets would not, of course, provide the same rigidity or mechanical strength to hold the desired shape or form. Therefore, if the silicone rubber layers are made thinner, e.g., for even better thermal conduction, Noma et al. specify an optional rigid reinforcing layer of plastic resin around the peripheral surface. They also specify that the outer silicone rubber layer is harder than the inner silicone rubber layer to provide more elastic resilient pressure on the inner silicone rubber layer, although both the inner and outer silicone rubber layers are of about the same thickness and heat is also conducted efficiently radially outward. This heat conductive rather than insulative feature is desired by Noma et al. for their application of preheating fluorescent and iodine bulbs, because once the bulb is started and creates its own heat, that heat has to dissipate radially outward through the heater, otherwise the bulb could over heat and destroy itself. Therefore, a heat insulator is not desirable for such bulb pre-heating applications and the heat conducting silicone rubber used by Noma et al. is satisfactory for that application. Noma et al. are aided by the fact that only part of the bulb can be covered by the heater, because a large aperture has to be left for the light created by the bulb to radiate outwardly. Therefore, they can specify curing the two silicone rubber sheets on a mandrel that is smaller in diameter than the light bulb to be heated. As a result, the heater, when mounted on the bulb, is still spread radially against its inherent resilient bias wider than its molded or cured diameter, which makes it easier to maintain a radially inward clamping resilient bias in the heater on the surface of the bulb on which it is mounted. The wider gap of the aperture is inconsequential, because the gap is essential for radiation of light from the bulb, anyway.

HPS Division of MKS Instruments, Inc., and Watlow Electric, Inc., the assignees of this patent application, developed a different heater structure primarily for heating pipe components, valve bodies, and the like for the semiconductor processing industry. Their VacuComp™ Series 43 Valve Heater Jackets, Flexible Section Heater Jackets, Straight Section Heater Jackets, and Bend Section Heater Jackets are examples of these pipe component heaters, which use a thin fiberglass reinforced silicone heater mat laid flat and cut into flat patterns that, when pulled up and forced into three dimensional curves, will conform to the three-dimensional shapes of pipe components for which they are patterned. Flat sheets of silicone foam rubber are also cut into somewhat the same shaped, but smaller patterns and are then bonded to an exposed flat surface of the heater mats for heat insulation, leaving uncovered edge sections of the heater mat extending laterally outward from the silicone foam rubber insulation sheets. Lace hooks and laces are attached to the uncovered edge sections of the heater for pulling and fastening the pipe heater structures into curved, three dimensional configurations around the valve bodies, flexible, curved, and straight pipe sections, and other pipe components for which they are patterned. There are substantial limitations and disadvantages, however, in this kind of heater structure. For example, in these pipe heaters that are made in essentially flat pieces, the amount of curvature to which the pipe heater can be deformed to wrap around and conform to a curved surface of a pipe component is limited. Larger diameter curved surfaces, such as 4-inch diameter and larger pipes, can be covered quite well. There is, however, a resilient flat shape memory that can cause an additional problem of "spring back" or inherent tendency to return to its original flat shape. Such shape memory or "spring back" can make installation of the heater around smaller diameter objects very difficult. This problem becomes consequential for diameters of about two inches or less where it is almost impossible to conform the heater exactly to the curved surface of the object to be heated, thus leave gaps between the object being heated and the heater. Such air gaps inhibit heat transfer by conduction from the heater to the object. The "spring back" problem is further exacerbated if the object being heated has a complex curvature. Also, while the silicone foam rubber insulation layer helps in reducing some heat loss, the benefit is limited. First, the exposed edge portions of the reinforced silicone rubber heater mats that are not covered by the silicone foam rubber insulation layer lose substantial heat to the surrounding atmosphere. Second, the lace hook attachment structures physically hold the exposed edge portions of the heater mat adjacent the lace hooks away from the pipe component surface, thereby creating air gaps between the heater mat and the pipe component surface. The metal lace hooks also contact the hot pipes and become very hot themselves, not only dissipating heat unnecessarily, but also presenting burn hazards to persons who might touch them. Still further, when the layers are thin enough to be sufficiently flexible to minimize the curvature conformation and spring-back problems described above, such as about 0.045 in. thickness fiberglass reinforced silicone rubber heater mat and about one-eighth to one-fourth inch thick silicone foam rubber insulation layer, the thermal insulation effect is insufficient to meet the industry standards for surface temperature described above.

The deficiencies in a heater fashioned on a silicone rubber structure for purposes of heating pipes became apparent in the VacuComp™ Series 43 Elbow Heater Jackets and Tee Heater Jackets developed by HPS Division of MKS Instruments, Inc., of Boulder, Colo., and Watlow Electric, Inc., of St. Louis, Mo., both of whom are assignees of this patent application, for heater applications on smaller pipes of 2-inch diameters or less. In those heaters, a very thin heater mat comprising a resistive wire heating element sandwiched between two thin fiberglass reinforced silicone rubber sheets is wrapped around a mandrel of the same size and shape as the pipe component to be heated, and a thick silicone rubber jacket is molded and cured over the thin heater mat in the shape of the pipe component to provide the structure to maintain the heater in that shape and size. The heater mat is kept thin—about 1.2 mm (0.045 in.) overall— so that the heat resistive wires are very close to the pipe surface with only the layer of about 0.6 mm (0.023 in.) of silicone rubber and fiberglass between the wires and the pipe. The silicone rubber jacket around the heater mat, which is about 5 mm (0.2 in.) thick to maintain the shape of the heater, is split longitudinally along one side to accommodate forcing it to open at the split enough to slip over the widest portion of the pipe component that is to be heated. The hope was that the silicone rubber would have enough resilient memory in its material structure to bias the heater back to its molded shape and size. To a degree, it does do so, but not to a sufficiently satisfactory degree. In fact, the silicone rubber, which is essentially a very dense, slightly deformable solid material, seems to develop enough internal molecular stresses in the curing process that tend actually to slightly deform the structure away from its molded shape and cause a bias to a slightly open configuration. Where Noma et al. could overcome such a problem for a lamp pre-heater application by molding their silicone rubber around a smaller mandrel, that solution is unavailable for pipe heaters where gaps or apertures in the jacket and heater mat cause loss of heating efficiency and allow undesirable loss of heat. Swaps fastened around the periphery of the heater jacket can help to force and hold the heater mat on the surface of the pipe component being heated, but there can still be gaps left between the heater mat and the pipe component surface, especially between straps, which also inhibit heat conduction from the heater mat to the pipe component being heated. Loss of heat is also a very substantial problem with the VacuComp™ Series 43 silicone rubber heaters, because, as mentioned above for the Noma et al. heater, silicone rubber, as a very dense, solid material, is a rather good heat conductor with a coefficient of conductivity in the range of about 0.28 to 0.30 Watts/meter-K. Consequently, the silicone rubber jacket conducts heat away from the heater mat and radially outward quite well to its peripheral surface. This characteristic not only causes undesirable loss of heat to the atmosphere from the peripheral surface of the silicone rubber jacket, but it also causes the peripheral surface of the silicone rubber jacket to be quite hot during operation of the heater, depending to some extent on how hot the heater mat and the pipe are maintained. For a temperature at the heater mat/pipe component interface in the range of 140° C. to 1600°C., the peripheral surface of the VacuComp™ Series 43 silicone rubber Elbow Heater Jackets and Tee Heater Jackets in ambient room temperature, about 20°–22° C. (68°–72° F.) is in the range of about 120° C. to 135° C., which is hot enough to burn someone who contacts it. Some industries, for safety purposes, are imposing maximum surface temperatures on pipe heaters to prevent burn injuries. For example, IBM Corporation has specified a maximum of 75° C. (167° F.) on surfaces of plastics and other low thermal conductivity equipment used in its semiconductor processing facilities. The VacuComp™ Series 43 silicone rubber Elbow Heater Jackets and Tee Heater Jackets described above would not meet those standards.

Consequently, in spite of the well-developed state of heater technology, there is still a need for a better, easier to use, and more effective heater/insulator product that can be installed quickly and easily on pipes and piping components, which stays in place, is aesthetically pleasing in appearance, and which transfers heat efficiently to the piping components and retains it there effectively.

SUMMARY OF THE INVENTION

It is a general object of this invention to provide a flexible heater for heating objects possessing two-dimensional curvature or three-dimensional curvature.

It is another general object of this invention to provide a heater that is preformed to fit the shape and size of an object to be heated.

It is another general object of this invention to provide a system of heaters for heating a network of objects possessing two-dimensional curvature or three-dimensional curvature.

It is a further general object of this invention to provide a heater that is quickly and easily removable from and reattachable to the object to be heated.

It is a more specific object of this invention to provide a heater for two dimensional or three dimensional curved surfaces that has a heating element directly adjacent the object to be heated.

It is a still further specific object of this invention to provide a heater for two dimensional or three dimensional curved surfaces that transfers heat radially inwardly to the piping component being heated while insulating against transfer of heat radially outward to minimize the outside surface temperature of the heater and prevent burns to persons who may touch the heater.

Another object of the present invention is to provide a heater that is aesthetically pleasing for heating two dimensional or three dimensional objects and that can be daisy-chained or ganged together with other heaters having similar characteristics along a piping network to form a system of heaters for the piping network.

Additional objects, advantages, and novel features of the invention shall be set forth in part in the description that follows, and in part will become apparent to those skilled in the art upon examination of the following or may be learned by the practice of the invention. The objects and the advantages may be realized and attained by means of the instrumentalities and in combinations particularly pointed out in the appended claims.

To achieve the foregoing and other objects and in accordance with the purposes of the present invention, as embodied and broadly described therein, the heater apparatus is comprised of a thin, flexible, but effectively unstretcheable heater mat that has an electric heating element sandwiched between two sheets of fiberglass reinforced silicone solid rubber or materials with similar qualities in a size and shape that conforms to an object to be heated and a sponge or foam rubber insulative jacket molded over the heater mat to compressively deform under external force but resiliently bias the heater mat back into its original shape and size when the external force is removed. Electric control circuits monitor heat and prevent damage, and a plurality of the heaters can be daisy-chained together with common temperature monitoring connections.

To further achieve the foregoing and other objects, the present invention further comprises a method of making a flexible insulated heater, by fabricated by the steps of vulcanizing and curing the two heater mat sheets together on a mandrel that has the same size and shape as the object to be heated with the electric heating embedded between the two sheets. The silicone sponge or foam rubber (or other material with similar qualities) jacket is then molded around the heater element while it is still on the mandrel to retain the desired size and shape. Electrical connections are also encapsulated.

BRIEF DESCRIPTION OF THE DRAWINGS

The accompanying drawings, which are incorporated in and form a part of the specifications, illustrate the preferred embodiments of the present invention, and together with the descriptions serve to explain the principles of the invention. In the Drawings.

DETAILED DESCRIPTION OF THE PREFERRED EMBODIMENTS

Figure 1:
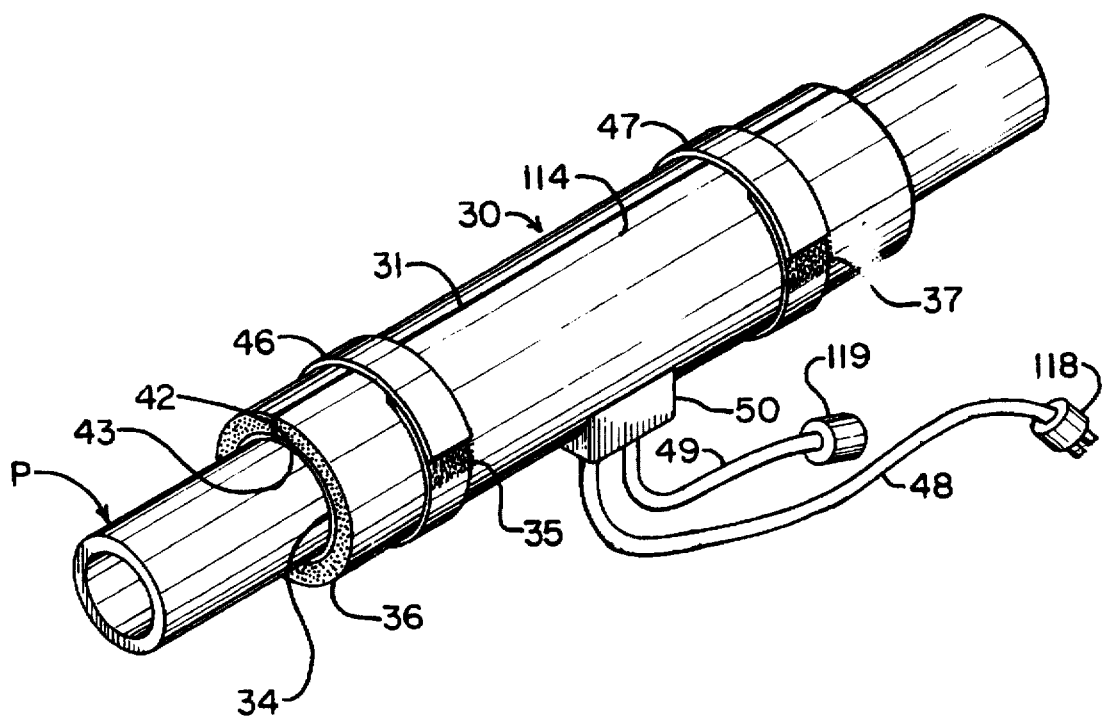
FIG. 1 shows an isometric view of a flexible cylindrical heater of the present invention surrounding a section of pipe and including retainer straps and electrical plug and socket connectors.

A resiliently flexible insulated heater 30 for use on objects having single or compound curvature according to the present invention is illustrated in FIG. 1 mounted on a section of pipe P. The heater 30 is preferably sized and shaped to conform to the curved surface of the object, such as pipe P, that is to be heated. The straight pipe P in FIG. 1 is an example of a single curvature object. Additional embodiments sized and shaped for mounting on and heating objects having compound curvatures, such as elbow fittings and valve bodies, are illustrated and described below.

The flexible heater 30 according to this invention has a structure comprising an unstretchable heater mat 34 and a stretchable jacket 36 of thermally insulative material bonded together in a combination that results in an inherent resilience and radially inward directed bias or material memory that tends to clamp and retain the heater mat 34 in contact with the surface of the object or pipe P being heated while also directing the flow of heat produced by the heater mat 34 radially inward and toward the object being heated while resisting heat flow radially outward and away from the object. This structure and the resulting functional advantages will be described in more detail below.

Figure 2:
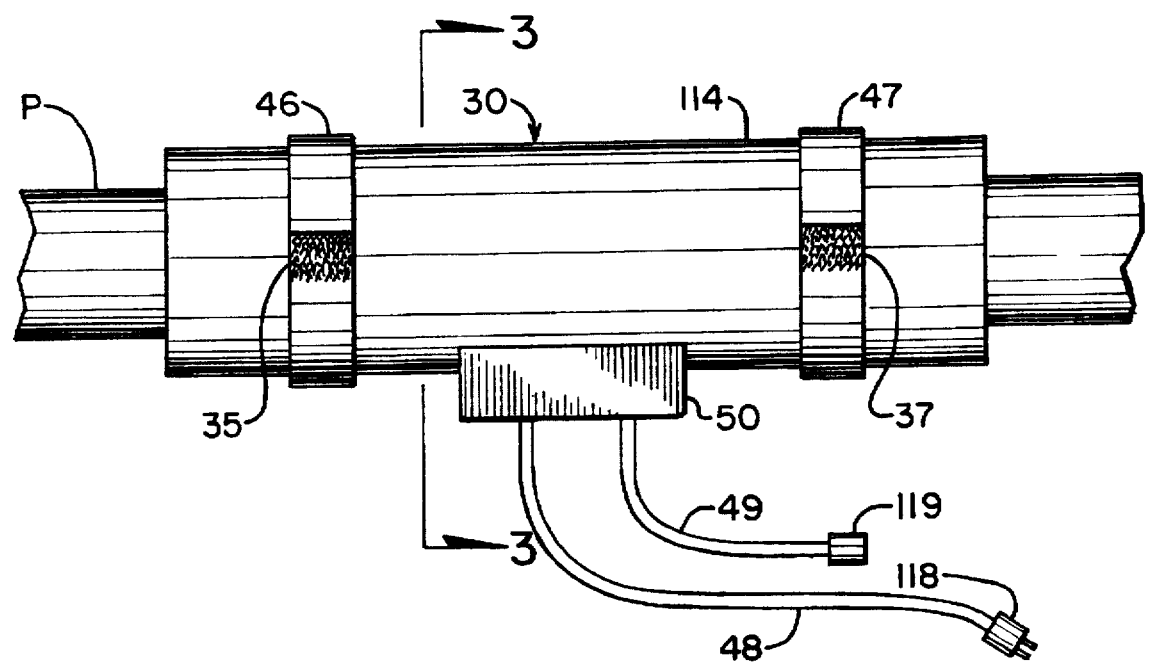
FIG. 2 is a side elevation view of the heater shown in FIG. 1.

Referring primarily to FIGS. 1 and 2, the heater 30 of this invention is mounted on the pipe P or other object to be heated with the heater mat 34 positioned in contact with the outer surface of the pipe P, so that heat generated by the heater mat 34 can be transferred primarily by conduction directly to the pipe P. The jacket 36 is a heat insulative material, which preferably has lower heat conductivity than both the heater mat 34 and the object or pipe P, extending radially outward from and substantially surrounding the heater mat 34. Since the jacket 36 is less heat conductive than the object or pipe P, heat produced by the heater mat 34 flows primarily radially inward toward the object or pipe P rather than radially outward away from the object or pipe P. This structure enhances efficient transfer of heat from the heater mat 34 to the object or pipe P, as described above, while keeping heat away from the outer peripheral surface 114 so that heat is not dissipated or lost and the surface 114 remains relatively cool or just warm to the touch so as to protect people who may come in contact with the heater 30 against burns.

Figure 3:
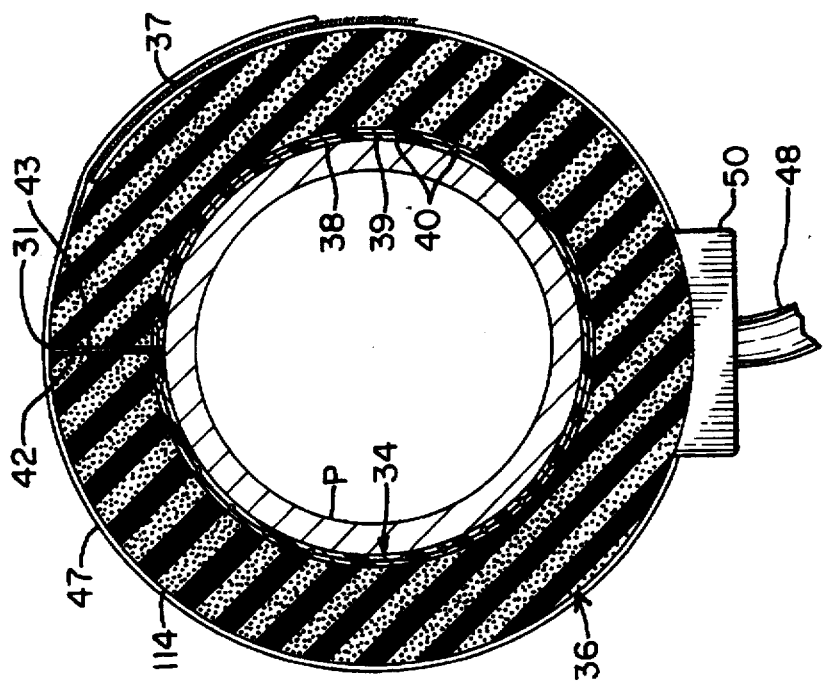
FIG. 3 is a cross-sectional view of the flexible cylindrical heater of this invention mounted on a pipe, taken along line 3—3 of FIG. 2.
Figure 4:
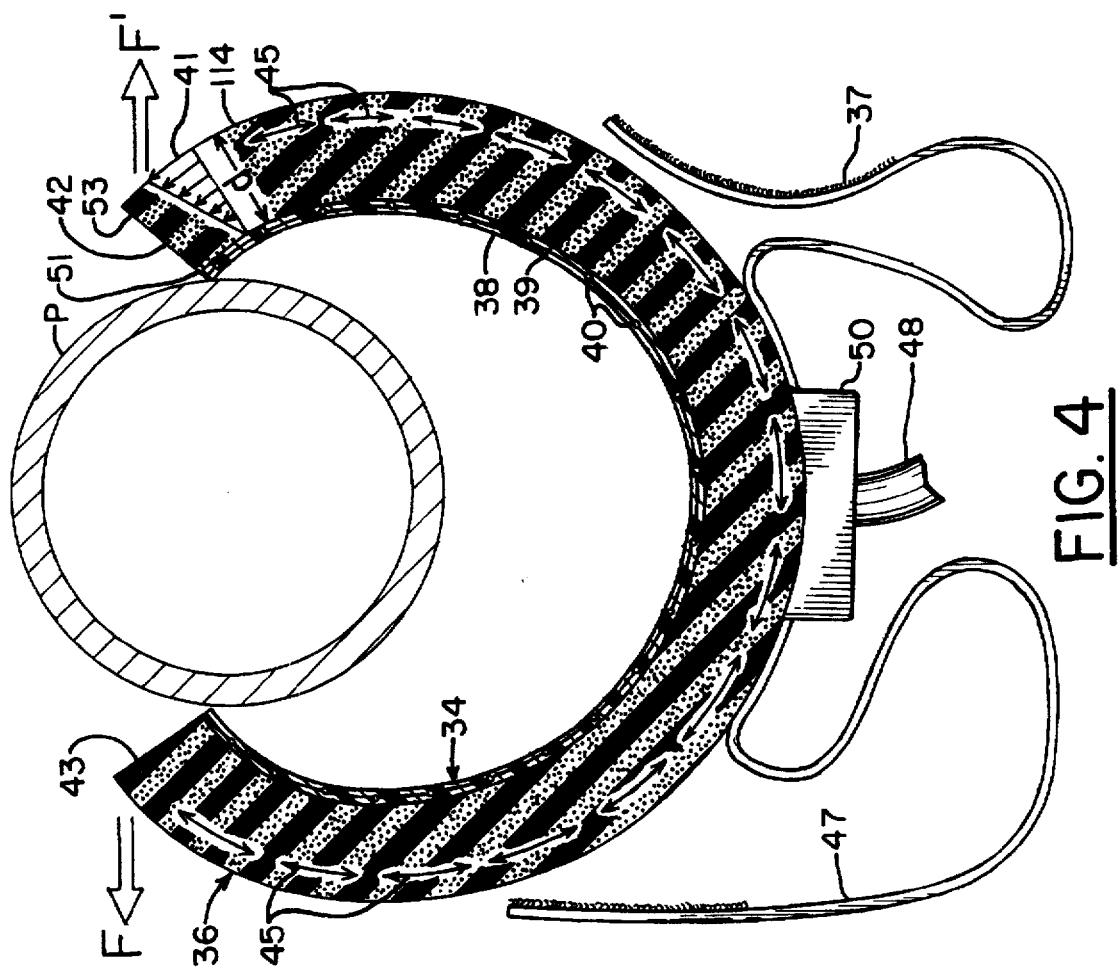
FIG. 4 is a cross-sectional view similar to FIG. 3, but showing the heater of this invention opened for insertion onto a pipe.

Referring now to FIGS. 3 and 4 in combination with FIGS. 1 and 2, the heater 30 has a longitudinal slit 31 that extends through both the jacket 36 and heater mat 34 so that the opposing ends or edge faces 42, 43 of the heater 30 that form the slit 31 can be separated apart for insertion over the peripheral surface of the pipe P during mounting, as will be described in more detail below. A pair of optional flexible straps 46, 47 are shown encircling the peripheral surface 114 of the heater 30, spanning the slit 31, for securing the heater 30 in place on the pipe P. Hook and loop fasteners 35, 37, such as Velcro™ fastening material, or any other well-known and convenient fasteners, are used to fix the opposite ends of the respective straps 46, 47 together, thereby preventing edge faces 42, 43 from being spread apart and resisting removal of the heater 30 from the pipe P or other object. A power cord 48 with a plug 118 extends into a decorative overmold 50, which overlays the heater 30 and protrudes radially outward from the heater 30 and the jacket 36. The power cord 48 can include, for example, Teflon™ coating making coated lead wire inside a silicone rubber coated fiberglass sleeving. Another optional electric cord 49 with a plug receptacle 119 extends out from the overmold 50 to provide power to another adjacent heater (not shown in FIGS. 1–5) that may be ganged or daisy chained together with the heater 30, as will be described in more detail below.

Referring now to FIG. 3 in combination with FIGS. 1 and 2, the heater mat 34 is preferably made of a resistive wire heating element 40 sandwiched between two fiberglass reinforced rubber sheets 38, 39 laminated together. The resistive wire heating element 40 can be fabricated of nickel-chrome, nickel-chrome-iron, nickel-copper, nickel-iron, or any other material that is commonly known and available that has enough resistance to the flow of electricity to produce substantial heat and a high enough melting temperature to withstand the heat generated in the wire heating element 40 when electricity is applied. For cylindrical objects, such as the pipe P shown in FIGS. 1–5, the heater mat 34 is preferably preformed with a curvature and size to conform to the surface of the object or pipe P to be heated. The sheets 38, 39 or at least the sheet 38, are preferably thin, so the wire heating element 40 is positioned very close to the object or pipe P when the heater 30 is mounted for use. Therefore, the inner sheet 38, which is interposed between the wire heating element 40 and the surface of the object or pipe P, is not a significant barrier to conduction of heat from the wire heating element 40 radially inward to the object or pipe P. The jacket 36 of thermally insulative material, such as a polymer foam or silicone sponge rubber, is molded over and adhered to the external surface of the heater mat 34 in a shape and size to complement the heater mat 34 in conforming to the surface of the object or pipe P to be heated. The insulated jacket 36, as discussed above, preferably has a lower heat conductivity than the object or pipe P, so that the jacket 36 effectively inhibits the heat generated by the resistive wire heating element 40 in the heater mat 34 from escaping radially outward, while there is little resistance to heat flow through the thin sheet 38 to the pipe P. The insulative jacket 36 also protects against burns to persons who might touch the heater 30.

When used for pipes, such as the pipe P shown in FIG. 1, the heater mat 34 and the jacket 36 are preferably sized and configured so that the juxtaposed edge faces 42, 43 meet and preferably touch, or at least nearly touch each other when the heater 30 is mounted on the pipe P or other object being heated. At the same time the combination of the heater mat 34 and the jacket 36 have sufficient resilient flexibility to allow opening the heater 30 by forcibly separating the edge faces 42, 43 enough to slip the heater 30 over the object or pipe P to be heated, as illustrated in FIG. 4. As discussed briefly above, the heater mat 34 is preferably fabricated with a substantially non-stretchable material, such as fiberglass reinforced rubber sheets 38, 39. Then, with the heater mat 34 formed and configured in a curve that is sized and configured to fit and conform to the surface of the object to be heated, the jacket 36 of a resilient, material, such as a polymer foam, which is more stretchable and more compressible than the heater mat 34 material, is molded and adhered to the exposed surface of outer sheet 39 of the heater mat 34. Therefore, the heater mat 34 and the inner portion 51 of the material of the jacket 36 adjacent the heater mat 34 are bonded in immovable relation to each other. Consequently, because the heater mat 34 is substantially unstretchable and substantially incompressible while the foam jacket 36 material is stretchable and compressible, forcibly separating the edge faces 42, 43 as illustrated diagrammatically by forces F and F' in FIG. 4, puts the outer portion 53 of the jacket 36 material into compression, as illustrated by the compression force arrows 45. In other words, although the foam material of jacket 36 is compressible, it resists such compression and has an inherent resilience that biases in the direction of compression force arrows 45. Whenever the spreading forces F and F' are sufficient to over power the inherent resistance to compression in the foam material of the jacket 36, the heater 30 will deform from its inherent shape, as shown in FIG. 4. However, when the spreading forces F and F' are removed or released, compression forces 45 in the outer portion of the jacket 36 foam material cause the heater 30 to resume its original inherent cylindrical or other formed shape. Consequently, the combination of the thin, bendable, but substantially unstretchable and incompressible heater mat 34 bonded in immovable relation to the resilient, compressible jacket 36 foam material provides a structure that is inherently biased to return to its formed shape and thereby to position the heater mat 34 in contact with the surface of the object or pipe P to be heated with the wire heating element 40 in close spatial proximity to the pipe P for effective conduction of heat from the wire heating element 40 to the pipe P while the jacket 36 also insulates and inhibits heat transfer radially outward from the heater mat 34. The straps 46, 47 can be used to secure the heater 30 snugly around the pipe P or other object to be heated, if desired, although the biased resilience of the heater 30 structure described above to its formed shape is generally sufficient itself to hold the heater 30 in place with good surface contact between the heater mat 34 and the pipe P.

Figure 5:
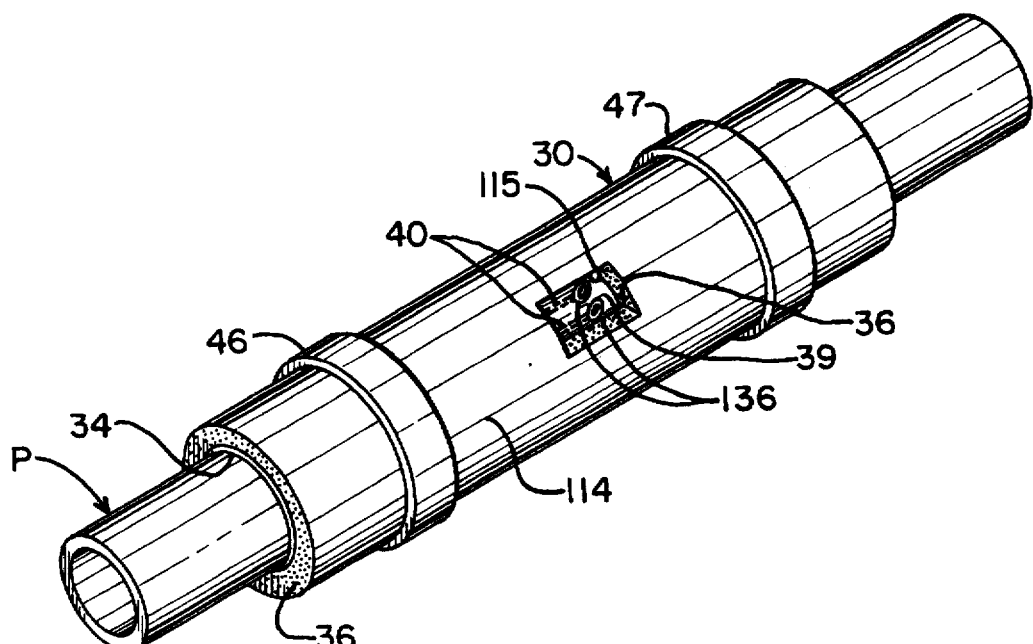
FIG. 5 is an isometric view of the flexible cylindrical heater of FIG. 1 and the control cavity.

Referring now to FIG. 5, the heater 30 includes a control cavity 115 in the jacket of thermally insulative material 36 that extends from the heater mat 34 to the outside surface 114 of the heater 30. As will be discussed in more detail below, the wire heating element 40 shown in phantom lines embedded in the heater mat 34 are terminated by eyelets 136 in metal shims to provide access points for electrical connection to the power cord 48 (not shown in FIG. 5) in the control cavity 115, so that electrical current can flow through the wire heating element 40 to generate heat in the heater mat 34. The wire heating element 40 can also be connected to intervening fuses, control circuits, thermostats, and other electrical circuit components, all of which are located in the control cavity 115 and will be described in more detail below. In addition, the heater 30 may include an optional monitor thermostat (not shown in FIGS. 1–5) which is located in the control cavity 115 but is not electrically connected to either the power cord 48 or the wire heating element 40, as will be discussed in more detail below.

The preferred, albeit not the only, method of making the heater 30, incorporates a vulcanization technique (particularly vulcanization in-the-round) for the heater mat 34 and then molding the foam insulation material of jacket 36 in-place around the vulcanized heater mat 34 to produce the final flexible heater 30. The molding procedure can use polymer foam insulation, silicone sponge rubber, silicone foam rubber, or other suitable material for the jacket 36. This method allows heaters to be manufactured that have single axis curvatures, such as the pipe heater 30 in FIGS. 1–2, or complex three-dimensional curvatures, such as the elbow-shaped heater 52 shown in FIG. 6 for surrounding and heating an elbow-shaped pipe fitting (not shown), the T-shaped heater 56 shown in FIG. 7 for surrounding and heating a T-shaped pipe fitting (not shown), and the valve heater 60 shown in FIG. 8 for surrounding and heating a valve body (not shown). Such pipe fittings and components as elbow fittings, T-fittings, and valve bodies, as well as many other fitting shapes and components that can be heated according to this invention are well-known to persons skilled in the art and need not be shown or described here for purposes of describing or understanding this invention. The particular heaters 30, 52, 56, 60 and method of making the heaters 30, 52, 56, 60 will be discussed in more detail below for examples of this invention. However, this invention is not limited to those specific shapes or heater configurations and may be formed or configured for any other shape or component as well.

Referring again to the cylindrical heater 30 in FIGS. 1–4, which except for the particular shape, can be used for describing preferred features common to all the possible shapes and configurations of the invention, the two sheets 38, 39 of thin (between 0.014 and 0.03 inches thick, i.e., 0.5 to 1.2 mm) material can be, for example, fiberglass reinforced silicone rubber, plastic film, fibre sheet, rubber, or other suitable material. Preferably, the two sheets 38, 39 are thin and made of substantially unstretchable and incompressible material that has fairly good heat conductivities, such as fiberglass reinforced silicone rubber as discussed above. The two sheets 38, 39 should also be thermally stable, have a low flammability, and not be prone to damage from the heat produced by the wire heating element 40. The sheets 38, 39 should also be dielectric material (electrical insulators), if the heater heating element 40 sandwiched between them does not have its own electric insulator coating. Optimally, the sheet 38 may comprise, for example, Permacel #P5012, and the sheet 39 may comprise, for example, Permacel #P564, both of which are manufactured by Permacel, Inc., of New Brunswick, N.J. Permacel #P564 and Permacel #P5012 both include fiberglass fabric with coatings of silicone rubber to bind the fiberglass together.

The two sheets 38, 39 of the heater mat 34 are laminated together, as will be discussed in more detail below, on either side of the resistive wire heating element 40 to provide a thermally stable, electrical insulation barrier for the wire heating element 40. The resistive wire heating element 40 is sandwiched between the two sheets 38, 39 and becomes embedded in the heater mat 34. The wire heating element 40 can be, for example, nickel-chrome, nickel-chrome-iron, nickel-cooper, or nickel-iron, as discussed above, and should be distributed throughout the area of the heater mat in sufficient density to get good heat conductivity into the pipe P or other object being heated, as will be discussed in more detail below. The wire heating element 40 can be single—or multi-strand, unsupported or supported on a fiberglass core. Also, although only a wire heating element 40 is illustrated, other well-known types of heating elements can also be used to generate heat in the heater mat 34. For example, other foil elements, chemically etched foil elements, deposited film, conductive polymers, or a thick film paste could also be used to generate heat inside the heater mat 34. The use of wire heating elements and the other heating element types discussed above is well-known to persons having ordinary skill in this art, and thus need not be shown or described in more detail for purposes of this invention.

The jacket 36 of thermally insulative material bonded to the heater mat 34, as described above, can be, for example, silicone sponge rubber, silicone foam rubber, polymer foam, epoxy foam, or polyurethane foam. Preferably, a silicone sponge or foam rubber is used because it bonds well to the silicone rubber surface of the heater mat 34 and because silicone sponge or foam rubber can withstand a considerable amount of heat without being damaged. For example, it may be desirable to heat the pipe to a temperature of up to two hundred degrees Celsius (200° C.). Silicone foam is also desirable because it can contain large volumes of air pockets. For example, the volume of the silicone sponge or foam rubber used in the jacket 36 of thermally insulative material can be as much as eighty percent (80%) air or more. Again, the Young's modulus (stiffness) of the silicone foam acts as though it were three-fourths air, which again is very low, and one-fourth solid rubber. The higher the Young's modulus for a given material, the more stiff or rigid the material.

The presence of the air has, for purposes of this invention, lowered both the thermal conductivity and the Young's modulus of the jacket 36, and, coincidentally, both contribute to vastly improved heater structures. The reduced thermal conductivity reduces heat loss and lowers the peripheral surface temperatures, while the reduced Young's modulus makes a jacket that is thick enough to provide effective insulation still flexible enough to install over a pipe, with the added benefit of also providing a structure in combination with the flexible, but unstretchable heater mat, that has good enough memory to maintain excellent structural integrity, as will be described in more detail below. Without the air in the foam, the heater 30 would have to be two inches thick, which would waste a lot of expensive rubber and make the heater hopelessly stiff and virtually impossible to install over a pipe.

Optimally, a silicone foam such as RTF 7000 manufactured by General Electric Company of Waterford, N.Y., can be used, because it has the desirable properties of thermal stability and adhesion. The RTF 7000 silicone foam is a multi-component silicone foam with a continuous operating temperature capability of 177° C. Variations in the ratios of the components and the mixing of the components will result in foam materials with different physical properties. For example, variations in the ratios could produce a less dense or a more dense foam material with correspondingly diminished or enhanced thermal conductivity, respectively.

The silicone sponge or foam rubber used for the jacket 36 turns out to have several advantages over the solid silicone rubber jackets used in prior art pipe heaters described above, the combination of which advantages was not foreseen until tried and provides a surprisingly effective advancement in pipe heaters over the previous state of the pipe heater knowledge and structures used. For example, the silicone sponge or foam rubber jacket 36 not only insulates much better than solid silicone rubber, which is a significant advantage in itself, but it, in combination with the thin, flexible, but unstretchable fiberglass reinforced silicone rubber heating mat 34, surprisingly provides better memory return to the original formed shape and size that conforms much better to the surface of the pipe component P for which it was formed than the silicone rubber jacket of the prior art heaters. The reasons for this extra combination of advantages of the silicone sponge or foam rubber over the solid silicone rubber are not readily apparent, but are now becoming more explainable after observing and studying this structure of this invention. First, it was not known whether the silicone sponge or foam rubber could be formed in place inside a closed mold, which to the knowledge of the present inventors had never been done before, as opposed to casting it in a flat sheet or slab. Second, it is believed that the silicone sponge or foam rubber, having much less material and density than solid silicone rubber, does not have nearly as much of the internal molecular stresses formed during curing as the solid silicone rubber has that cause an inherent internal bias radially outward from the original formed shape and size. Third, the Young's modulus of the silicone sponge or foam rubber used in the jacket 36 of this invention is much less than the Young's modulus of the solid silicone rubber, thus is much more elastic and easy to deform. Therefore, any inherent molecular bias in the silicone sponge or foam rubber jacket 36 near the bond surface between the silicone sponge or foam rubber and the fiberglass reinforced solid silicone rubber heater mat 34 that might tend to impart a slight radial outward bias to the heater 30 structure are more easily overcome and rendered ineffective by the compression forces 45 in the silicone sponge or foam rubber jacket 36 that resist such radial outward spreading. Fifth, the coefficient of thermal conductivity of the silicon sponge or foam rubber jacket 36 can be in the range of about 0.06 to 0.12 watts/meter-K. Therefore, the thickness of the silicone sponge or foam rubber that is necessary to provide sufficient thermal insulation to keep the surface of jacket 36 to temperatures of no more than 75° C. (167° F.) is in a range that also happens to be very advantageous from a structural standpoint. For example, with a coefficient of thermal conductivity of about 0.85 watts/meter-K, a temperature of 150° C. at the heater mat 34 can be attenuated by jacket 36 to less than 75° C. by a silicone sponge or foam rubber jacket 36 about one-half inch thick.

Figure 24:
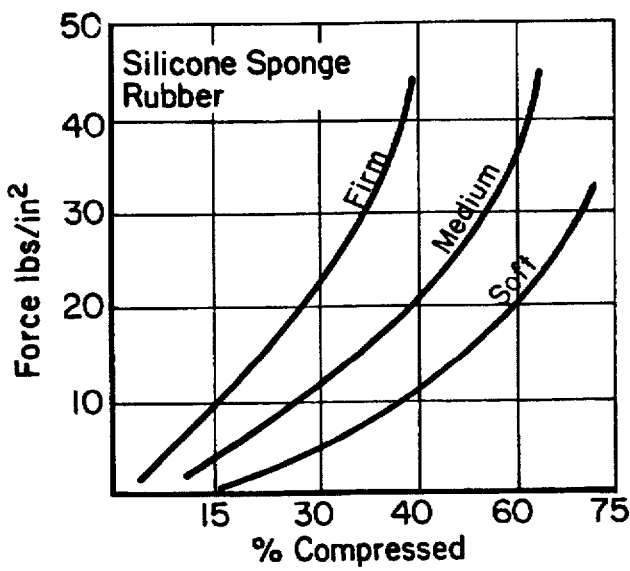
FIG. 24 is a graph that shows Compression Modulus at room temperature of a preferred silicone sponge rubber plotting percent (%) Compressed versus Force in pounds per square inch (lbs./in.$^2$) for firm, medium, and soft formulations.
Figure 25:
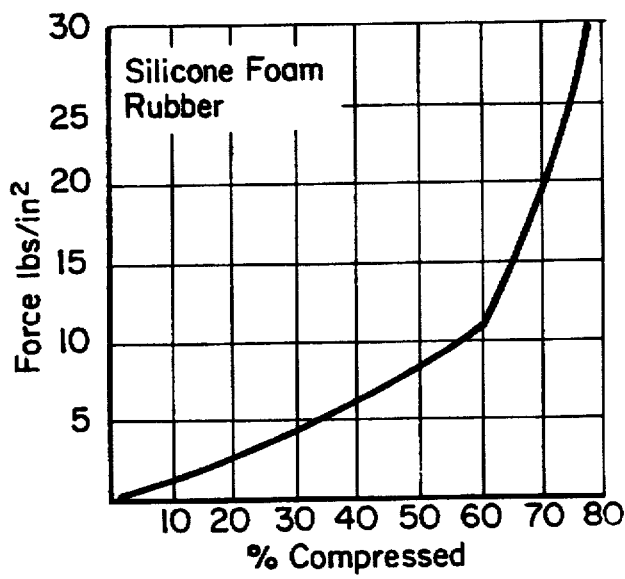
FIG. 25 is a Compression Modulus graph similar to FIG. 24 for an even softer silicone foam rubber formulation.

Coincidentally, the silicone or foam rubber materials have compressibility modulus, illustrated by FIGS. 24 and 25, in a range that is effective to resist compression flexure with enough force in those same thickness ranges that provide effective insulation to bias the jacket 36 and heater mat 34 back to the original formed shape. Referring to FIGS. 3 and 4, when external forces F–F' deform the heater 30 radially outward, as shown in FIG. 4, the jacket goes into compression as generally indicated diagrammatically by arrows 45. More accurately, a stress profile 41 develops in the cross-section of the silicone sponge or foam rubber jacket 36. Since the heater mat 34 is essentially unstretchable and incompressible for practical purposes of this invention, the heater mat 34 defines the neutral axis of the compression stress profile 41 with compressive stresses ranging from maximum at the peripheral surface 114 a distance d from the heater mat 34 to zero at the heater mat 34. Therefore, the stress force f at the peripheral surface 114 acting through the moment arm of the distance d creates a torque of f×d that acts on the flexed heater mat 34 to return it to its original formed shape and size. The magnitude of the force f will, of course, vary, depending on how much the silicone sponge or foam rubber is compressed at that distance d, as illustrated by the compression modulus charts of FIGS. 24 and 25. Of course, as the compression stress profile 41 decreases to zero toward the heater mat 34, the distances or moment arms for each incremental stress force in the profile 41 decrease and the resultant incremental torque is also less. Integrating across the profile 41 can provide a total torque for any given material and compression that acts on any point of the heater mat 34, which will return and maintain the heater 30 in its original formed shape and size around the pipe P when the external forces F–F' are removed.

The more effective insulation provided by the silicone sponge or foam rubber jacket 36 in thicknesses that are practical yet able to keep the peripheral surface 114 temperature below 75° C. was a hope for the heater 30 of this invention, but the structural integrity provided by combination of materials in the jacket 30 and heater mat 34 was an unexpected, but pleasant surprise. It allows the heaters 30, 52, 56, 60 to be removed from and reinstalled on the pipe components very quickly, easily, and many times over. This capability is important in the semiconductor processing industry, where it is not unusual to have to break down and take apart piping systems for cleaning on a monthly or even weekly basis.

Figure 26:
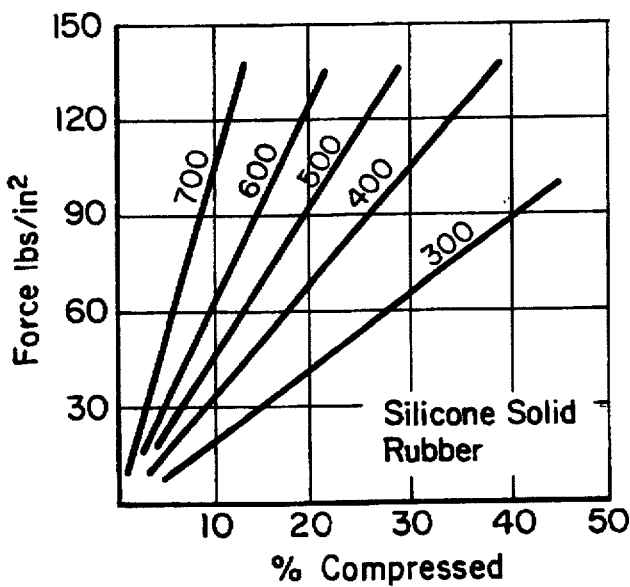
FIG. 26 is a Compression Modulus graph similar to FIGS. 24 and 25 for several formulations of silicone solid (no porosity) rubber for comparison, including the 500 formulation used in a prior art silicone solid rubber heater jacket. (The designations 300, 400, . . . , 700 in this graph correspond to durometer hardness values of 30 Shore A, 40 Shore A, . . . , 70 Shore A, e.g., the 500 formulation line corresponds to a 50 Shore A durometer hardness.)

Any silicone sponge or foam rubber with a compression modulus in any of the ranges shown in FIGS. 24 or 25, as opposed to those indicated in FIG. 26 for silicone solid rubber, will work according to this invention, although silicone sponge rubber in the medium to soft range in FIG. 24 is preferred. A thickness of about 0.5 inch of this material for jacket 38 is preferred for the optimum combination thermal insulation and memory bias functions of this invention, as explained above.

The jacket 36 of thermally insulative silicone sponge or foam rubber material as described above prevents the heat generated by the heater mat 34 from escaping radially outward, which increases the amount of heat conducted to and absorbed by the pipe P, as described above. This feature reduces the amount of power required to heat the pipe P and the jacket 36 of thermally insulative material and also minimizes the temperature of the outside surface 114 of the heater 30 so that personnel working in the area do not become accidently burned. For example, some companies prefer that the temperature of the outside surface 114 be less than seventy-five degrees Celsius (75° C.) (167° F.).

Figure 6:
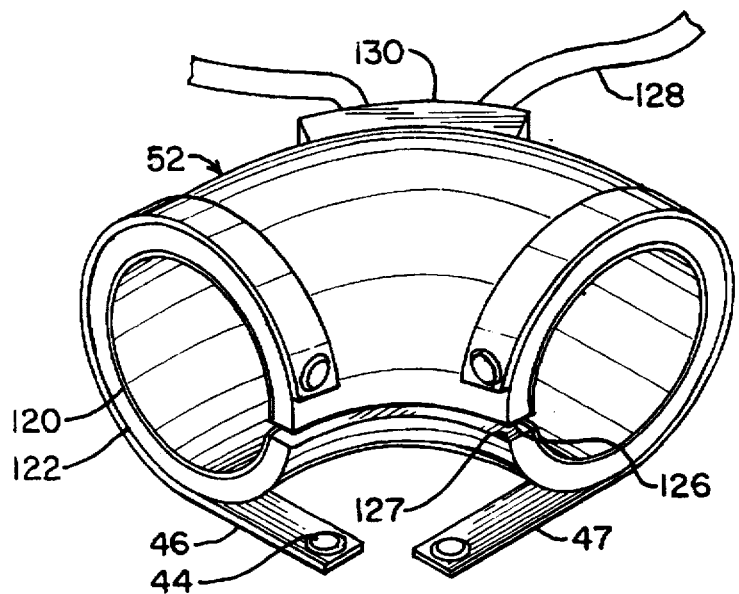
FIG. 6 is an isometric view of a flexible elbow-shaped heater of this invention.
Figure 7:
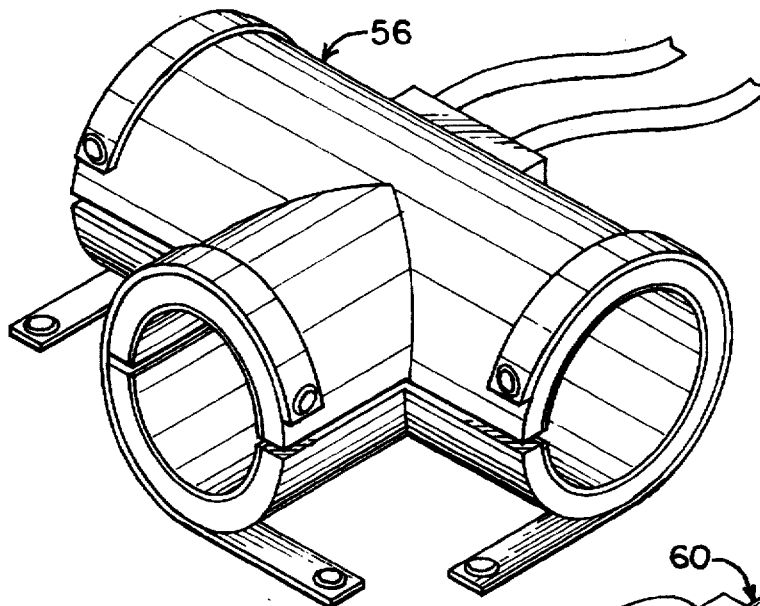
FIG. 7 is an isometric view of a flexible T-shaped heater of this invention.
Figure 8:
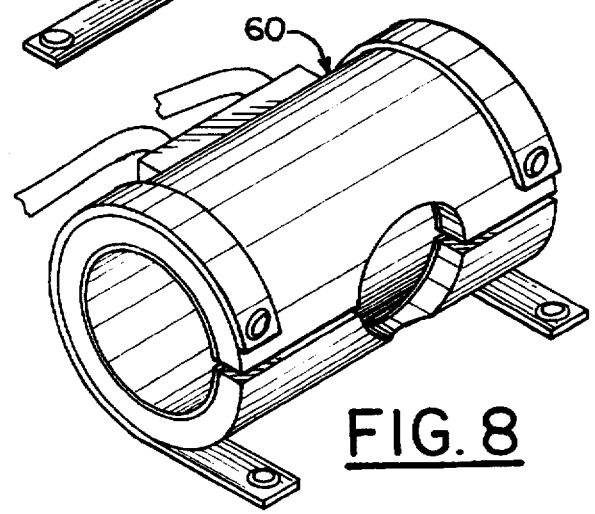
FIG. 8 is an isometric view of a flexible valve heater of this invention.

As previously discussed, the optional straps 46, 47 with hook and loop fasteners 35, 37 of FIGS. 1 and 2 or other suitable fasteners, such as snaps 44 illustrated in FIGS. 6–8, can be used to secure the heaters 30, 52, 56, 60 snugly around the pipe P or other object to be heated, although the biased resilience of the heaters 30, 52, 56, 60 to their respective formed shapes is generally sufficient itself to hold the heaters 30, 52, 56, 60 in place around the pipe P or other object. The hook and loop fasteners 35, 37, snaps 44, or other suitable fasteners allow the heaters 30, 52, 56, 60 to be quickly and easily secured around and removed from the pipe P. The capability for quick and easy removal and/or replacement of the heaters 30, 52, 56, 60 can be particularly important in, for example, a piping network that is unusable when the heaters 30, 52, 56, 60 are removed. The straps 46,47 are arranged such that the hook and loop fasteners 35, 37 or snaps 44 are preferably positioned on the smooth outside surface 114 of the heater 30, 52, 56, 60 and not over the gap or slit 31 between the edge faces 42, 43, which makes it easier to fasten the hook and loop fasteners 35, 37 or the snaps 44 than if the fasteners were positioned over the gap or split 31.

Referring again to FIG. 5, the control cavity 115 has a hollow interior to house the electrical connections and circuits. This control cavity 115 can be filled with a silicone solid rubber encapsulant such as, for example, DC 3120 RTV, manufactured by Dow Corning of Midland, Mich., to encapsulate the circuit components in cavity 115. As previously discussed above, the wire heating element 40 terminated at eyelets 136 is connected to the power cords 48, 49 (not shown in FIG. 5) in the control cavity 115 so that electrical current can flow through the wire heating element 40 to generate heat in the heater mat 34.

Figure 9:
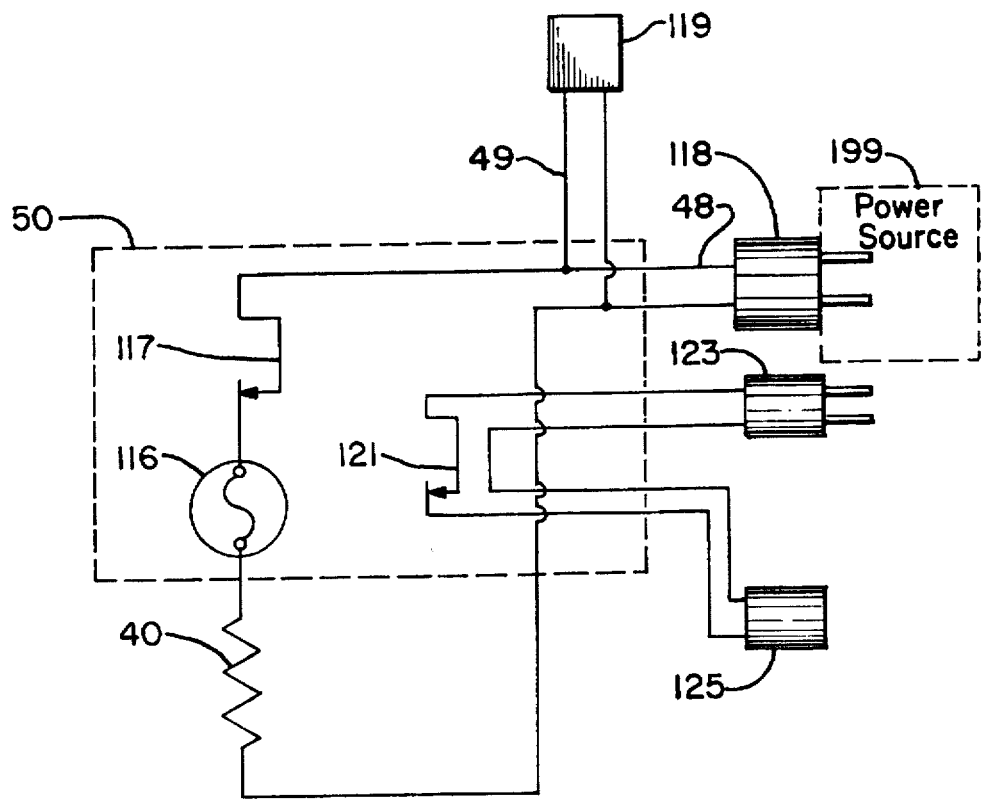
FIG. 9 shows a schematic diagram of the electric circuit of the flexible insulated heater of FIG. 1.

The electric control circuit for the heater mat 34 positioned in the control cavity 115 (FIG. 5) and then encapsulated is shown schematically in FIG. 9, wherein the wire heating element 40 is illustrated schematically in FIG. 9 as a resistor or resistive load. The control circuit preferably includes a thermostat 117 for maintaining a desired temperature range for the heater 30, for example, in the range between 50° Celsius and 200° Celsius. A thermal fuse 116 serves as a non-resettable thermal limit to protect the heater 30 from overheating and burning out or melting the silicone rubber or other materials used in the heater 30 fabrication in the event of a failure of the thermostat 117. The thermal fuse 116 can be, for example, a 4377A1 manufactured by Micro Devices Product Group of Therm-O-Disc, Inc. of Mansfield, Ohio. The thermostat 117 can be, for example, a 3450RC manufactured by Elmwood of Pawtucket, R.I., which can be chosen during the manufacture of the heater 30 to maintain a specific temperature of, for example, 95° C. or 135° C.

The male plug end 118 of the power cord 48 and the female plug end 119 of the optional power cord 49 are shown in the circuit of FIG. 9 connected in parallel across the wire heating element 40 (illustrated schematically as a resistor) to allow a series of heaters 30 (or other heater configurations) to be ganged or daisy chained together, as will be discussed in more detail below. An optional monitor thermostat 121 can also be positioned in control cavity 115 and connected to the male plug 123 for detecting when the heater 30 has failed. More specifically, in the event of a power failure or burn out of the wire heating element 40, the heater 30 will begin to cool down. The monitor thermostat 121 in the control cavity 115 detects such a change in temperature and either breaks or creates a continuity in its own electric circuit and thereby cream a signal indicative of a failure of heater 30 that can be detected by a local or remote monitoring device (not shown) to which the plug 123 is connected. Such electric circuit monitor devices, which can be as simple as a light emitting diode (LED) for visual observation or as complex as a computerized industrial plant management system, are well-known and need not be described or shown here for understanding this failure monitoring feature of this invention. The monitor thermostat 121 can also be connected to an optional female plug end 125 to accommodate a series of monitor thermostats to be serially daisy chained together. Alternatively, the monitor thermostat 121 can be connected to the male plug end 123 and the female plug end 125 such that a series of monitor thermostats are daisy chained in parallel. In the parallel configuration, a visual observation device (not shown), such as, for example, a light emitting diode (LED), can be placed in series with each of the parallel monitor thermostats 121 so that the light emitting diode (LED) will emit light or not emit light depending on the state of the monitor thermostat 121 to indicate the specific heater that is defective. The monitor thermostat 121 can be, for example, a Model C Thermostat/ Thermal Protector manufactured by Portage Electric Products, Inc., of North Canton, Ohio.

The elbow-shaped heater 52 shown in FIG. 6 is representative of other heaters having three-dimensional curvature, such as the heater 56 in FIG. 7 and the heater 60 in FIG. 8, for purposes of describing and understanding the features of this invention. Therefore, only the elbow-shaped heater 52 will be discussed in further detail. In almost all respects other than shape, the elbow-shaped heater 52 is much the same as the heater 30 of FIGS. 1-5. The elbow-shaped heater 52 includes a non-stretchable heater mat 120 and a stretchable and compressible jacket 122 of thermally insulative material bonded to the heater mat 120. The heater mat 120 includes two sheets of fiberglass reinforced rubber laminated together with a wire heating element (not shown) sandwiched in between the two sheets, the same as the two sheets 38, 39 and the wire heating element 40 of the heater 30. The insulative material in the jacket 122 can be, for example, silicone foam, polymer foam, epoxy foam, or polyurethane foam. Preferably, a silicone foam such as, for example, RTF 7000 manufactured by General Electric Company of Waterford, N.Y., is used for the jacket 122 of thermally insulative material for the heater 52.

The heater 52 is formed with a curvature and size to conform to an elbow-shaped pipe fitting (not shown). The heater mat 120 and the jacket 122 of thermally insulative material are configured so that the heater 52 has interfacing opposite edge faces 126, 127 that meet and preferably much each other when the heater 52 is mounted on an elbow-shaped pipe fitting. The edge faces 126, 127 preferably extend longitudinally along the innermost are of the elbow-shaped pipe fitting, thereby minimizing potential heat loss from the heater 52 through the slit created between the edge faces 126, 127. While the illustrations in FIGS. 6-8 show a slight gap at the slit between juxtaposed edge faces 126, 127 for purposes of illustrating the structure more clearly, the combination of the heater mat 120 and the jacket 122 of thermally insulative material have sufficient resilient internal bias for the reasons described above for heater 30 to close the edge faces 126, 127 against each other. The structure also has sufficient resilient flexibility to allow opening the heater 52 by separating the edge faces 126, 127 enough to slip the heater 52 over an elbow-shaped pipe, whereupon the heater 52 then resumes its original elbow shape around the elbow-shaped pipe when released. The power cord 128 provides electrical power and control to the wire heating element (not shown) in the heater mat 120 in a fashion similar to that described above for the heater 30 shown in FIGS. 1-5 and 9.

The heater 52 is preferably formed of a size and shape that completely surrounds the elbow-shaped pipe (not shown) on which it is mounted so that there are no exposed areas of the elbow-shaped pipe, no exposed areas of the heater mat 120 that are not covered by the insulative jacket 122, and no gaps in the jacket 122 of thermally insulative material. In addition, the heater 52 does not require lacing or hooks to secure the heater 52 to the elbow-shaped pipe, which can save considerable time when installing or removing the heater 52, although optional straps 46, 47 with snaps 44 or other fasteners can be provided to secure the heater 52 against unintended removal by someone brushing against it or knocking it off the elbow pipe fitting.

As previously discussed, a significant feature of the present invention is the method used to manufacture the heaters 30, 52, 56, 60 discussed above. The method of the present invention is suitable for manufacturing heaters to surround and heat objects having two-dimensional or three-dimensional curvature and reduces or eliminates "spring back" characteristics of the resulting heaters by forming the heaters with an internal bias to the desired configuration, as described above. The term "spring back" as used herein refers to the tendency of some prior art heaters to uncurl away from the curved surface of the pipe or fitting on which they are mounted. Reducing or eliminating the "spring back" according to this invention reduces the potential for air gaps between the heater 30, 52, 56, or 60 and the object being heated, which would inhibit efficient heat flow by conduction from the heating mat to the pipe fitting. Furthermore, the preferred method of the present invention allows heaters to be made that have a relatively thick jacket of thermally insulative material, while also enhancing placement of the heater mat 34 in contact with substantially the entire surface of the object to be heated.

Figure 10:
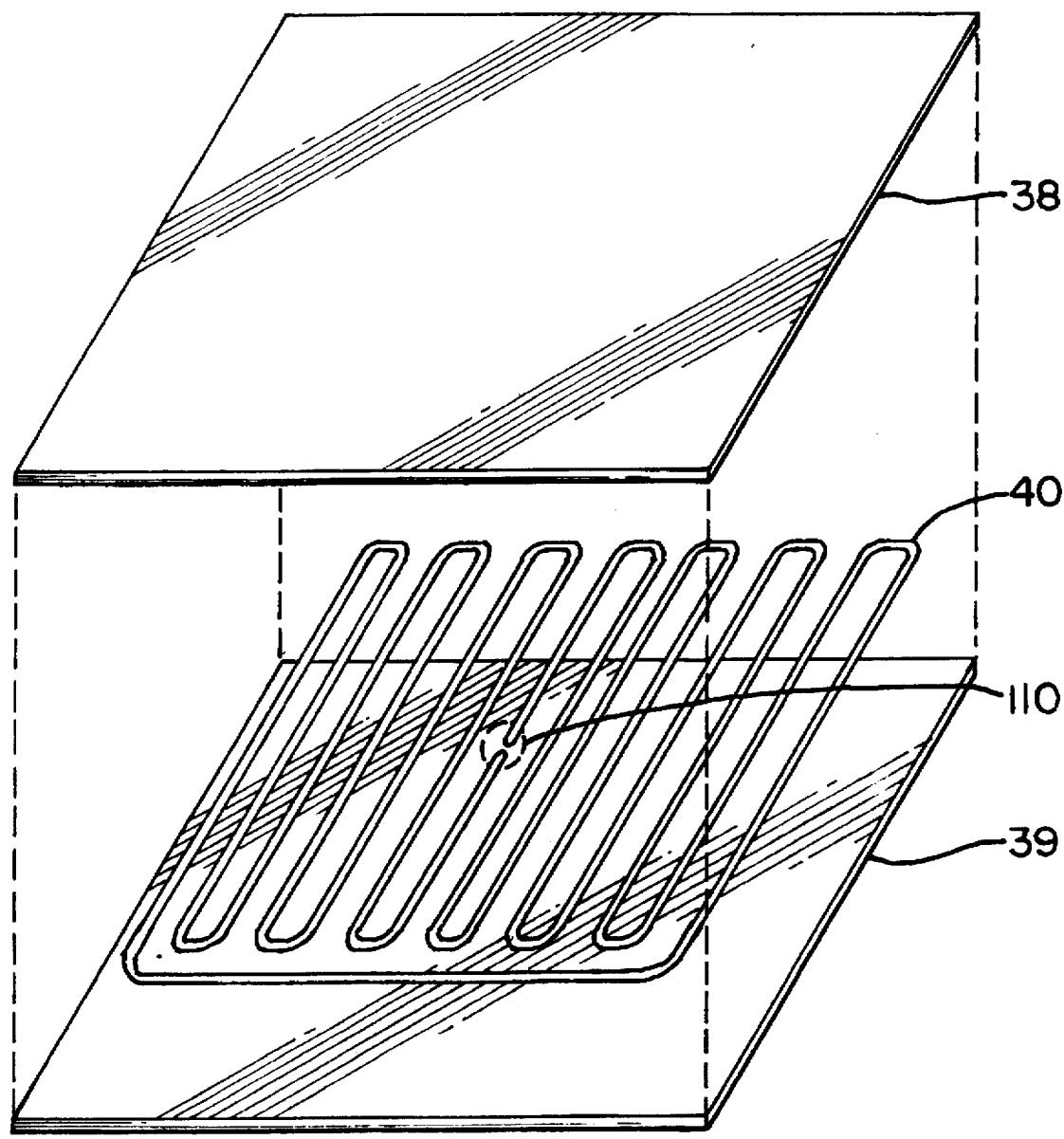
FIG. 10 is a diagrammatic, isometric view (not in true shape or size) of two substrate sheets of the heater mat and the wire heating element prior to assembly to illustrate the structure forming the heater mat of the flexible heater of FIG. 1.
Figure 11:
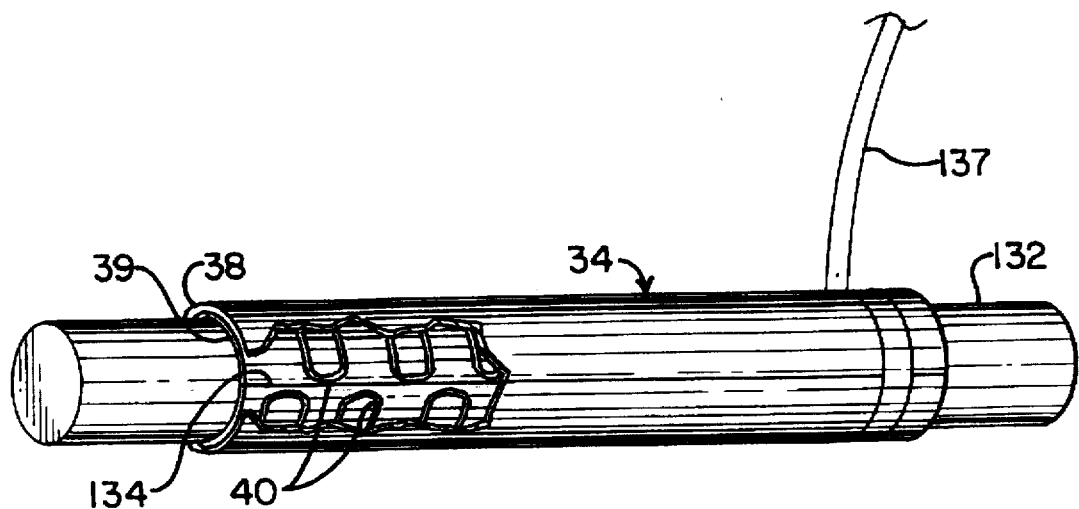
FIG. 11 is a diagrammatic, isometric view of the heater mat with a cutaway revealing the wire heating elements wrapped around a mandrel in preparation for vulcanization by the Mylar material wrap and bake method.
Figure 19:
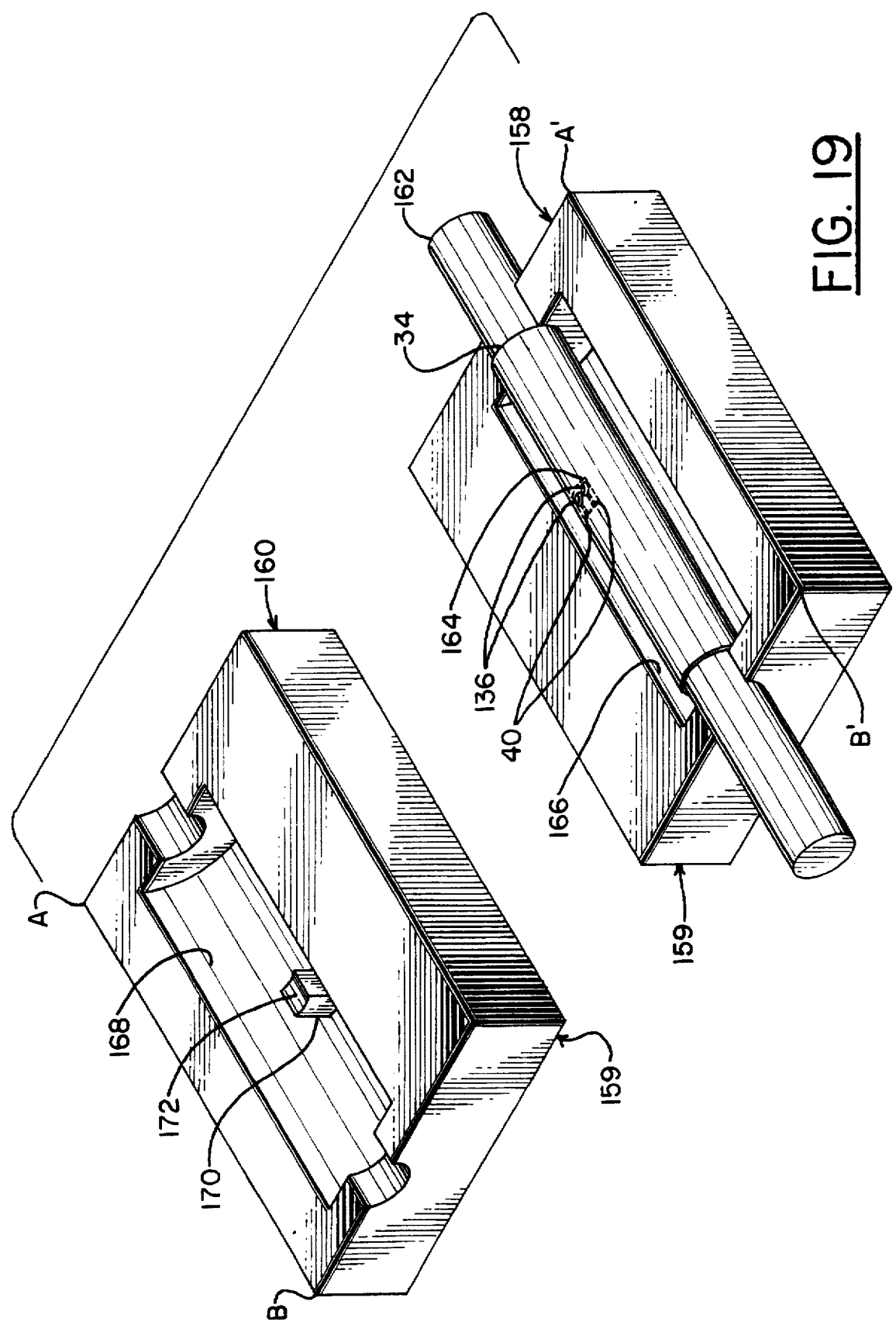
FIG. 19 is a diagrammatic, isometric view of the vulcanized heater mat wrapped around a mandrel in preparation for transfer molding of thermally insulative material around the heater mat to form the flexible insulated heater of FIG. 1.

As shown diagrammatically in FIG. 10, the heater mat 34 is formed initially by positioning the wire heating element 40 between the sheets 38, 39, which are preferably, but not necessarily, partially cured silicone solid rubber sheets. Then a vulcanization process is used to bond the two sheets 38, 39 together in a laminate with the wire heating element 40 sandwiched between the sheets 38, 39. The vulcanization is done preferably "in-the-round", i.e., in the curved shape and size preferred for the finished heater so that the resulting heater mat 34 has an inherent structure that, while flexible or bendable, naturally conforms to the curved shape of the object to be heated. Optimally, the vulcanization is based on a Mylar™ material "wrap and bake" method illustrated in FIG. 11. The sheets 38, 39 of fiberglass reinforced rubber are positioned around a cylindrical mandrel 132 with the wire heating element 40 positioned between the sheets 38, 39, as illustrated in FIG. 11. The wire heating element 40 is configured in a serpentine, sinuous, or geometrical pattern, as desired with the preferred goal to get heat distribution over substantially the entire area of the heater mat 34, but the wire heating element 40 is also configured and positioned so that it does not cross longitudinal line 134, which can, but does not have to be, defined by the sheets 38, 39. The line 134 will eventually be part of the slit 31 of FIG. 1, where the juxtaposed edge faces 42, 43 (FIGS. 1-4) will be separable. Therefore, by positioning the wire heating element 40 so as not to cross the line 134 (FIG. 11), the wire heating element 40 will not interfere with opening the heater by forcibly separating the edge faces 42, 43 (FIGS. 1-4), as described above. The cylindrical mandrel 132 in FIG. 11 has a diameter approximately equal to the diameter of the pipe P in FIG. 1. The openable joint along the longitudinal line 134 allows the heater 30 to be opened for insertion over a pipe P, as described above. The eyelets 136 of the wire heating element 40 shown in FIGS. 5 and 19 provide the electrical access points to which the power cord 48 (FIGS. 1-2) and the intervening fuses, control circuits, thermostats, and other electrical circuit components shown schematically in FIG. 9 and described above are later connected by soldering or other state of the art electrical connection techniques.

In the Mylar™ material wrap and bake method of vulcanization illustrated in FIG. 11, a band 137 of Mylar™ material or other suitable stretchable and heat shrinkable material is wrapped around the outer sheet 38 and around the mandrel 132 at room temperature. The band 137 of Mylar™ material can be, for example, DuPont 65 Heat Shrinkable Mylar™ material manufactured by DuPont of Wilmington, Del., which will shrink upon being heated. After the sheets 38, 39 are wrapped tightly in the band 137 of Mylar™ material, the wire heating element 40, and the mandrel 132 are placed in an oven (not shown) at an approximate temperature of 325° F. for approximately thirty minutes. During this process, the Mylar™ material shrinks and applies radially inward directed pressure at ten (10) to fifteen (15) pounds-per-square-inch (PSI) to the two sheets 38, 39 on the mandrel 132 so that the two sheets 38, 39 vulcanize and interlock together to form a unitary layer of contiguous heater mat material with the wire heating element 40 positioned inside. After the vulcanization is complete, the band 137 of Mylar™ material is removed from the heater mat 34, and the newly formed heater mat 34 is removed from the cylindrical mandrel 132. The operation and use of the Mylar™ material wrap and bake method of vulcanization is well-known to people having ordinary skill in the art and need not be discussed in further detail for purposes of this invention.

Figure 12:
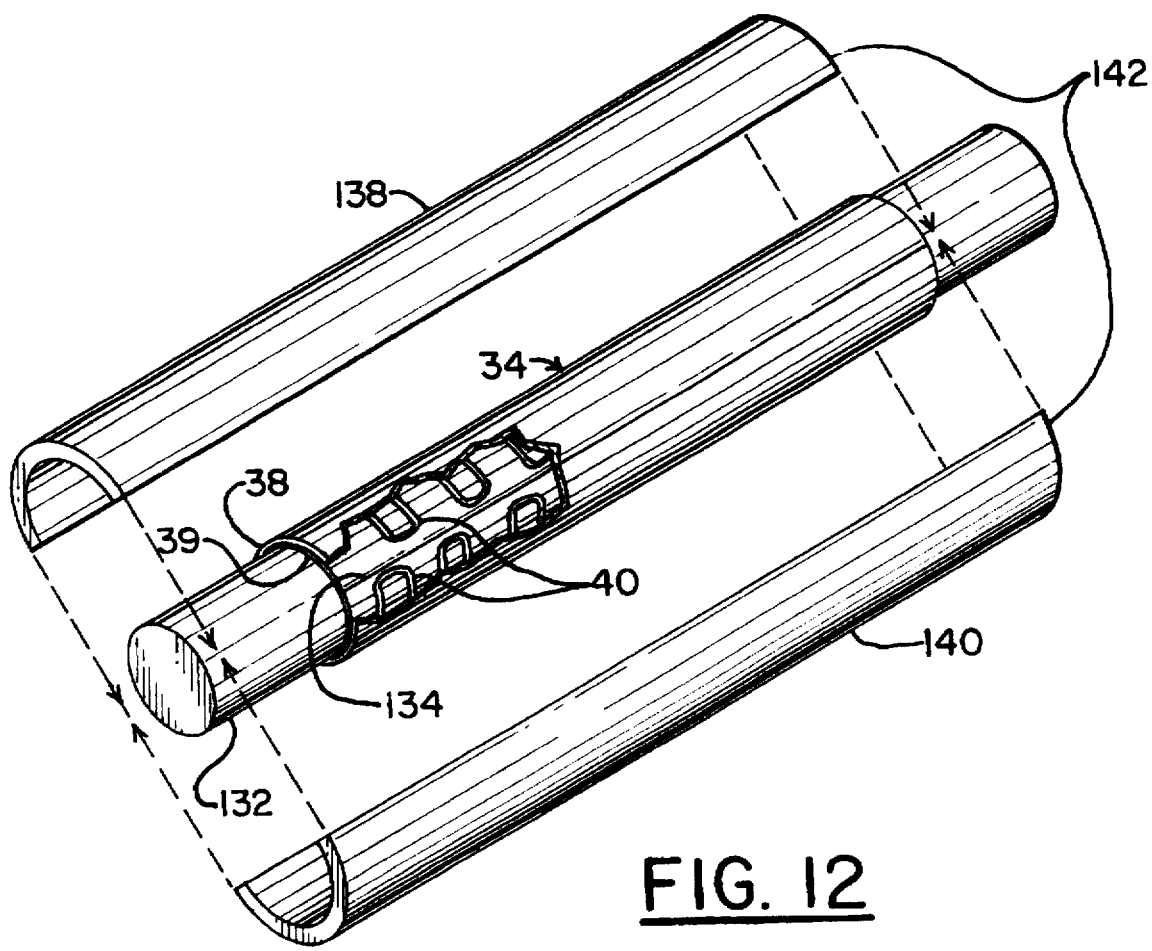
FIG. 12 is a diagrammatic, isometric view of the heater mat with a cutaway revealing the wire heating elements wrapped around a mandrel in preparation for vulcanization in a platen press.

An alternative to the Mylar™ material wrap and bake vulcanization process described above for bonding the two sheets 38, 39 together in a laminate with the wire heating element 40 positioned between the two sheets 38, 39 is to apply the pressure by curved plates 138, 140 shown in FIG. 12, instead of the shrinking band 137 of Mylar™ material of FIG. 11. In this process, the two sheets 38, 39 of fiberglass reinforced rubber in FIG. 12 are positioned around a heatable cylindrical mandrel 132 with the wire heating element 40 positioned between the sheets 38, 39. The wire heating element 40 is positioned so that it does not cross longitudinal line 134, as described above. The cylindrical mandrel 132 has a diameter approximately equal to the diameter of the pipe P in FIG. 1. Therefore, when the heater mat 34 is finished, it can be severed or separated along the longitudinal line 134 to create an openable seam or joint to match the edge faces 42, 43 shown in FIG. 1. The two portions 138, 140 of an outer heatable platen 142, or any other suitable heating structure that applies radially inward pressure, are then positioned onto the outer surface of the outer sheet 39, as indicated by the broken line arrows in FIG. 12 to sandwich the sheets 38, 39 between the cylindrical mandrel 132 and the platen 142. After the two portions 138, 140 of the platen 142 are pressed onto the sheets 38, 39 at a pressure of approximately twenty-five (25) pounds-per-square-inch (PSI), the cylindrical mandrel 132 and the platen 142 are then heated to a temperature of approximately 350° F. for approximately ten (10) minutes to vulcanize the fiberglass reinforced rubber sheets 38, 39 together with the wire heating element 40 positioned between them to form the heater mat 34. After vulcanization is complete, the platen 142 is removed, and the newly formed heater mat 34 is removed from the cylindrical mandrel 132.

Figure 13:
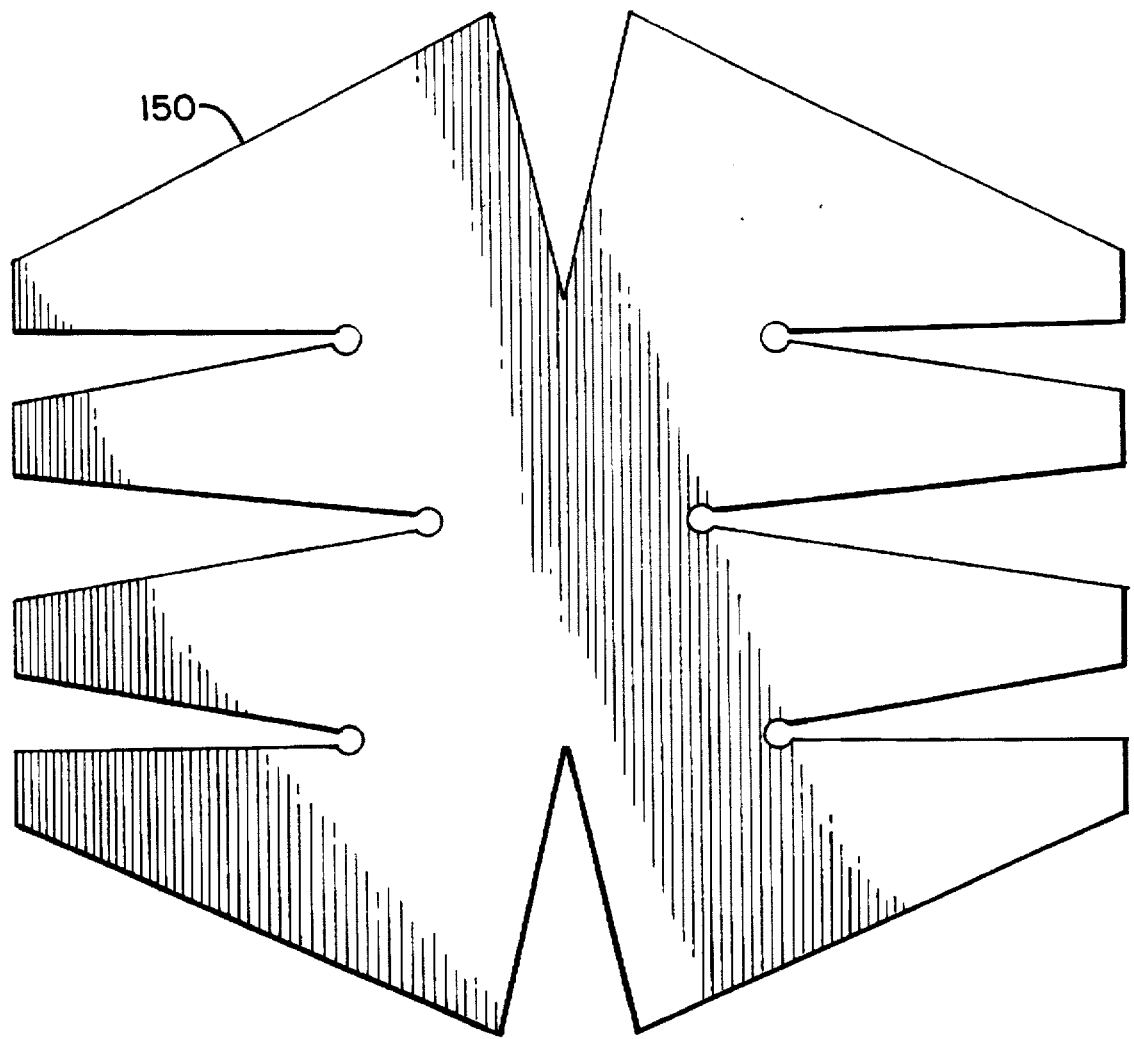
FIG. 13 is a plan view of the pre-vulcanized heater mat used in the elbow-shaped heater of FIG. 6.
Figure 14:
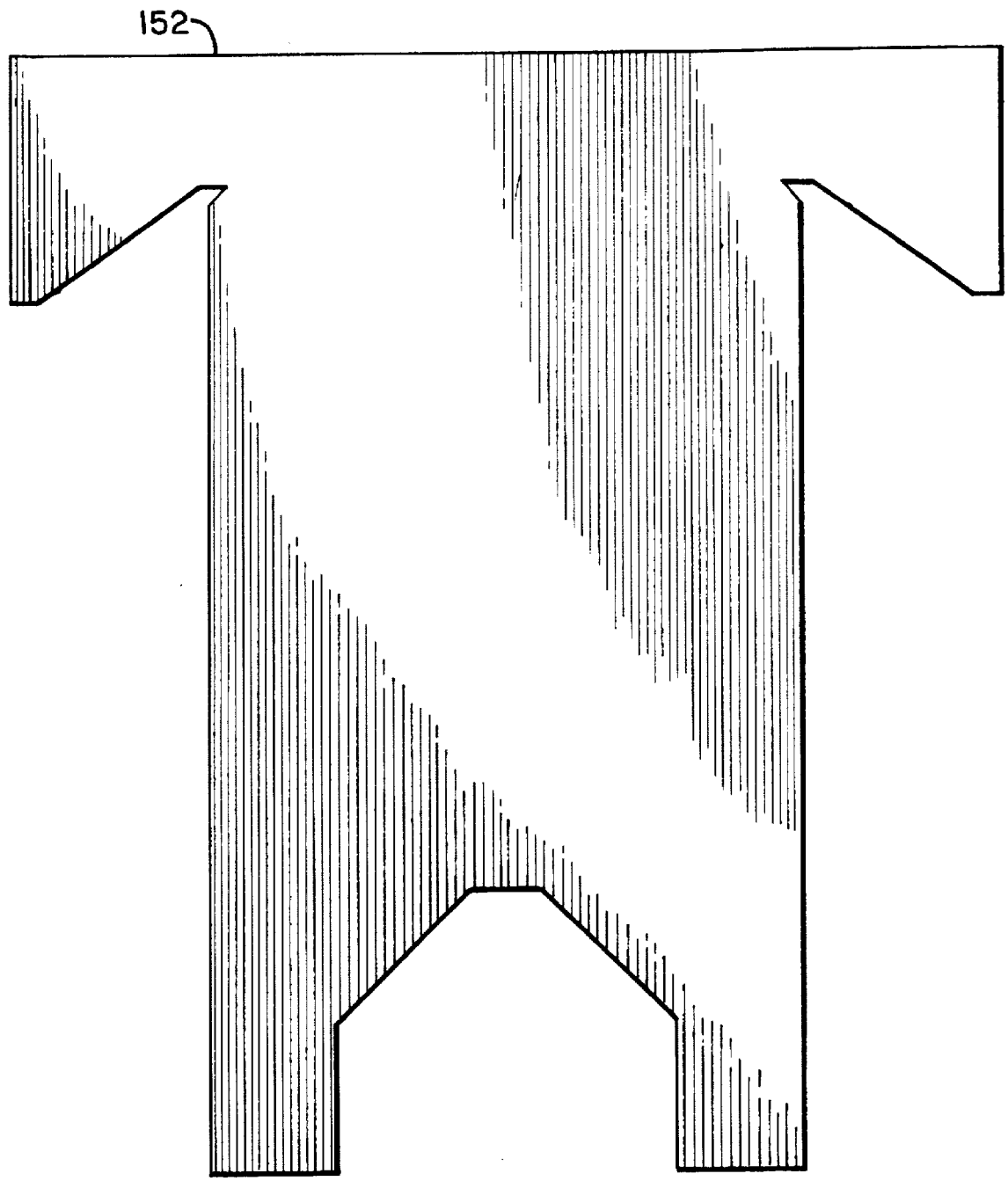
FIG. 14 is a plan view of the pre-vulcanized heater mat used in the T-shaped heater of FIG. 7.
Figure 15:
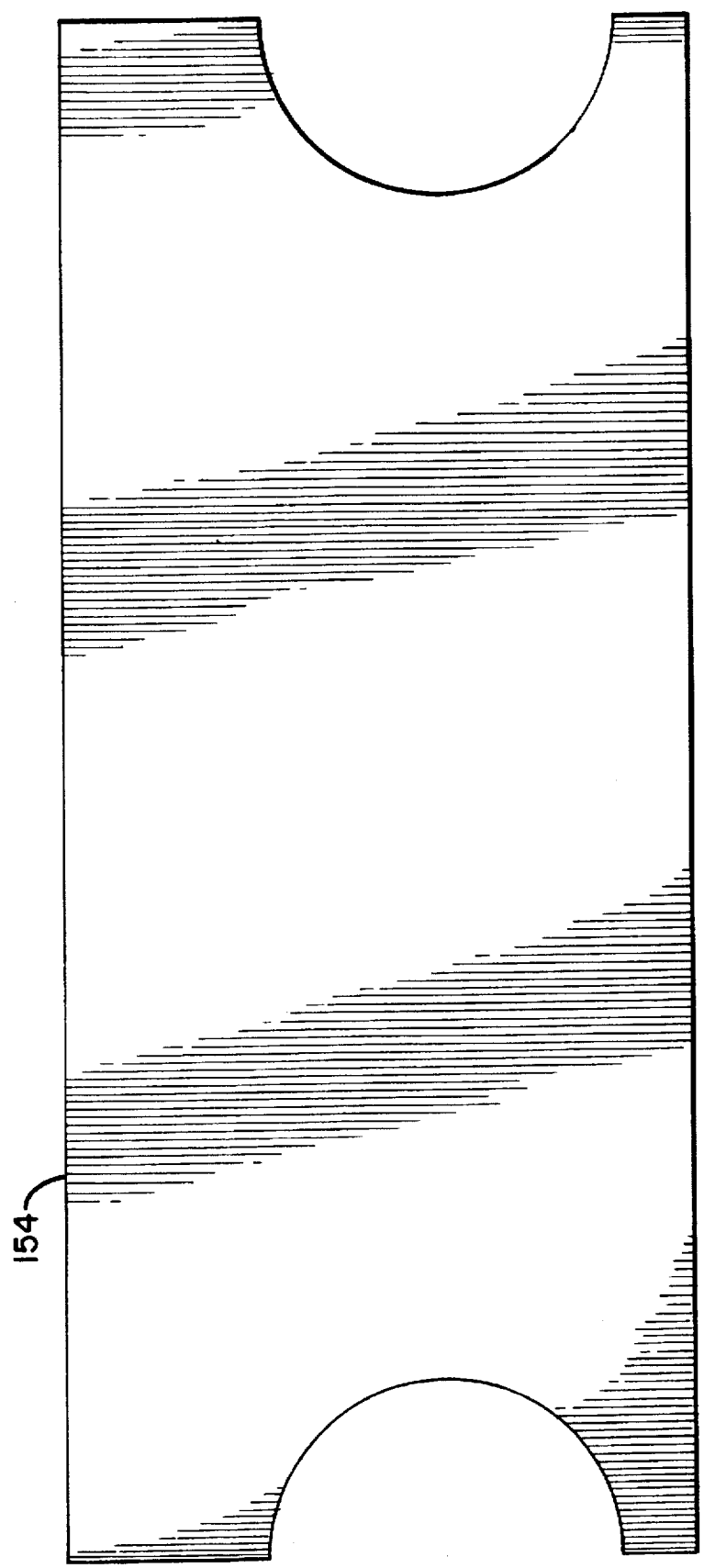
FIG. 15 is a plan view of the pre-vulcanized heater mat used in the valve heater of FIG. 8.
Figure 16:
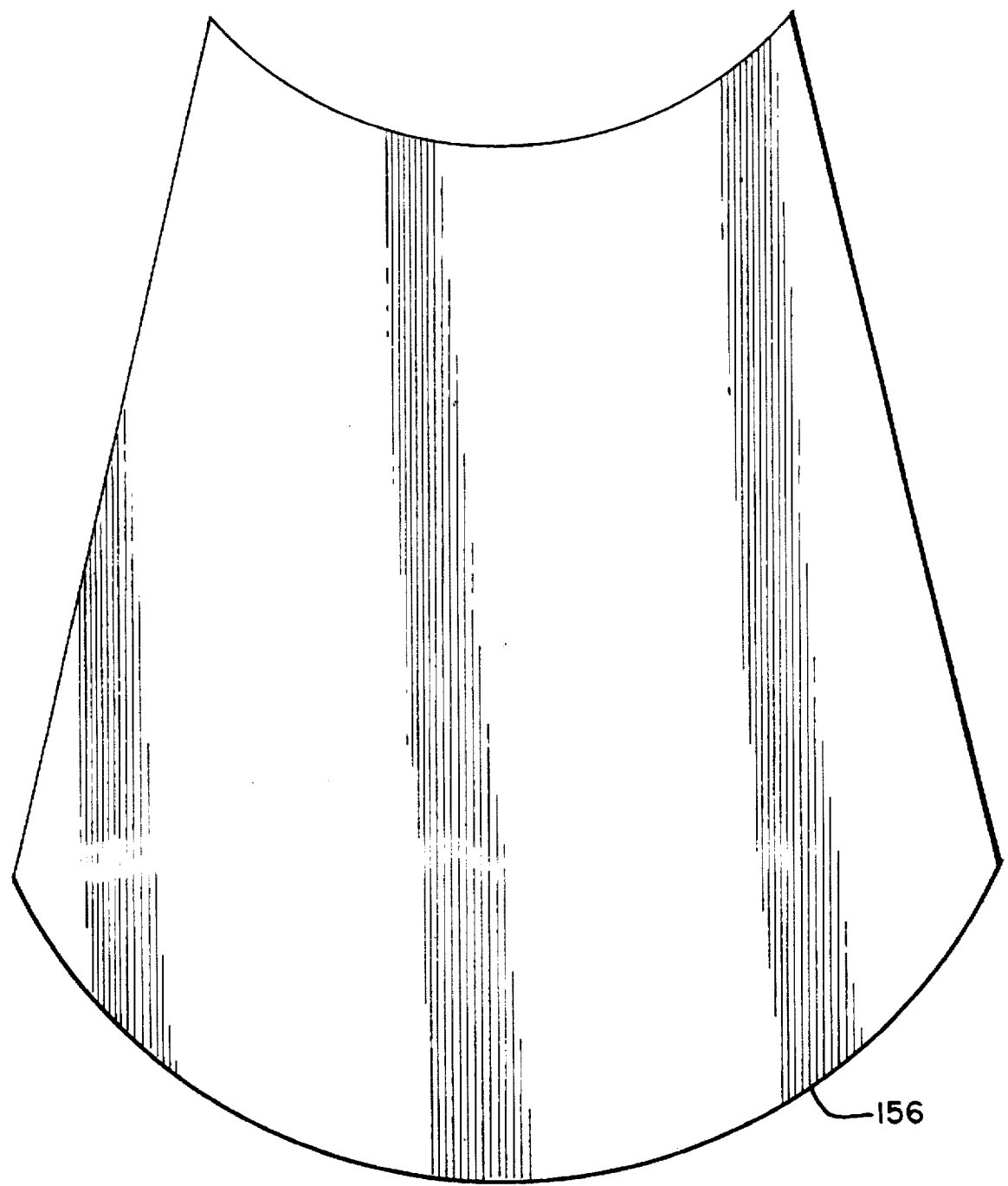
FIG. 16 is a plan view of a pre-vulcanized heater mat used in a conical-shaped heater.
Figure 17:
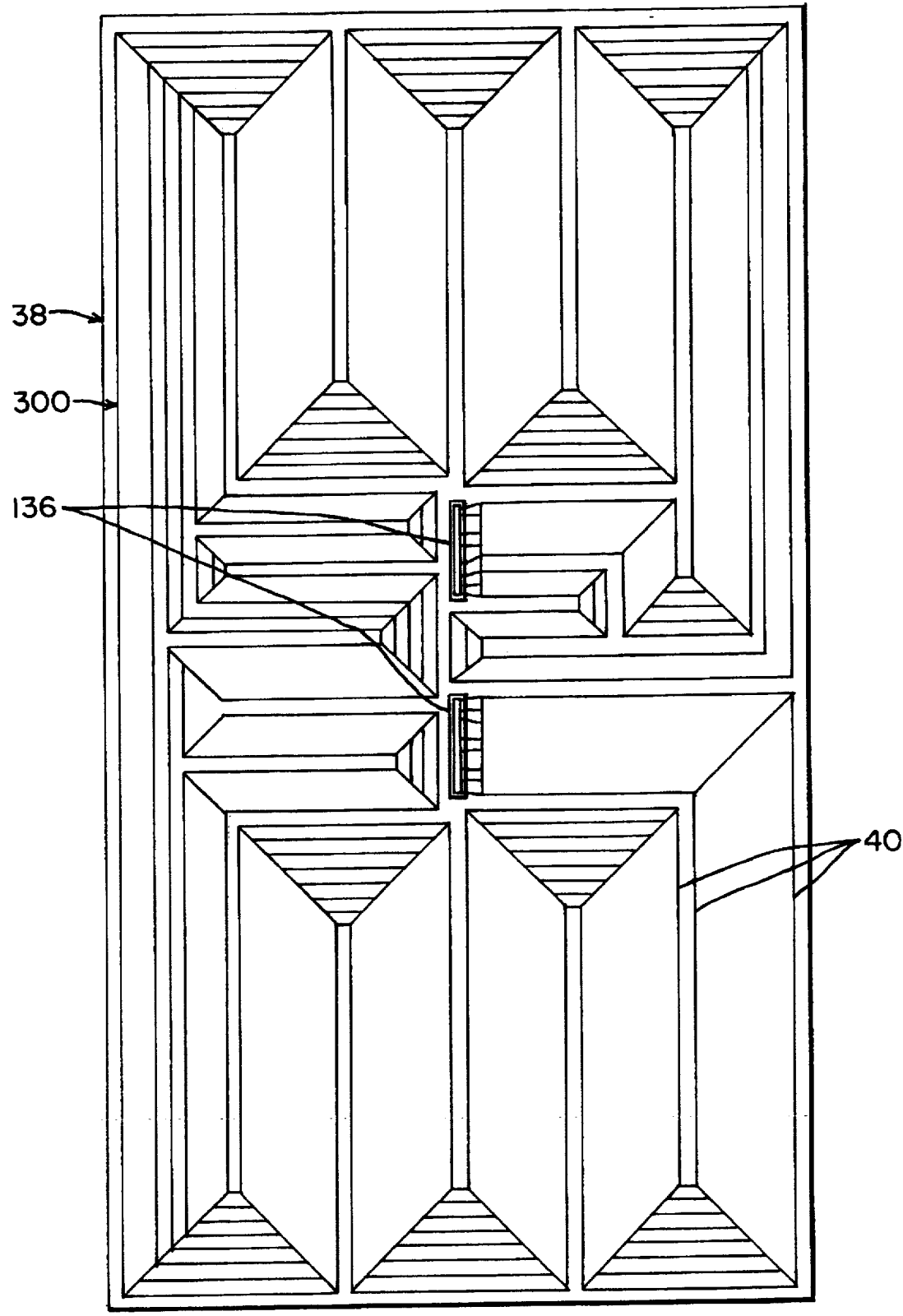
FIG. 17 shows a diagram of an exemplary pattern for the wire heating element used in the preferred embodiment flexible insulated heater of FIG. 1 according to this invention.
Figure 18:
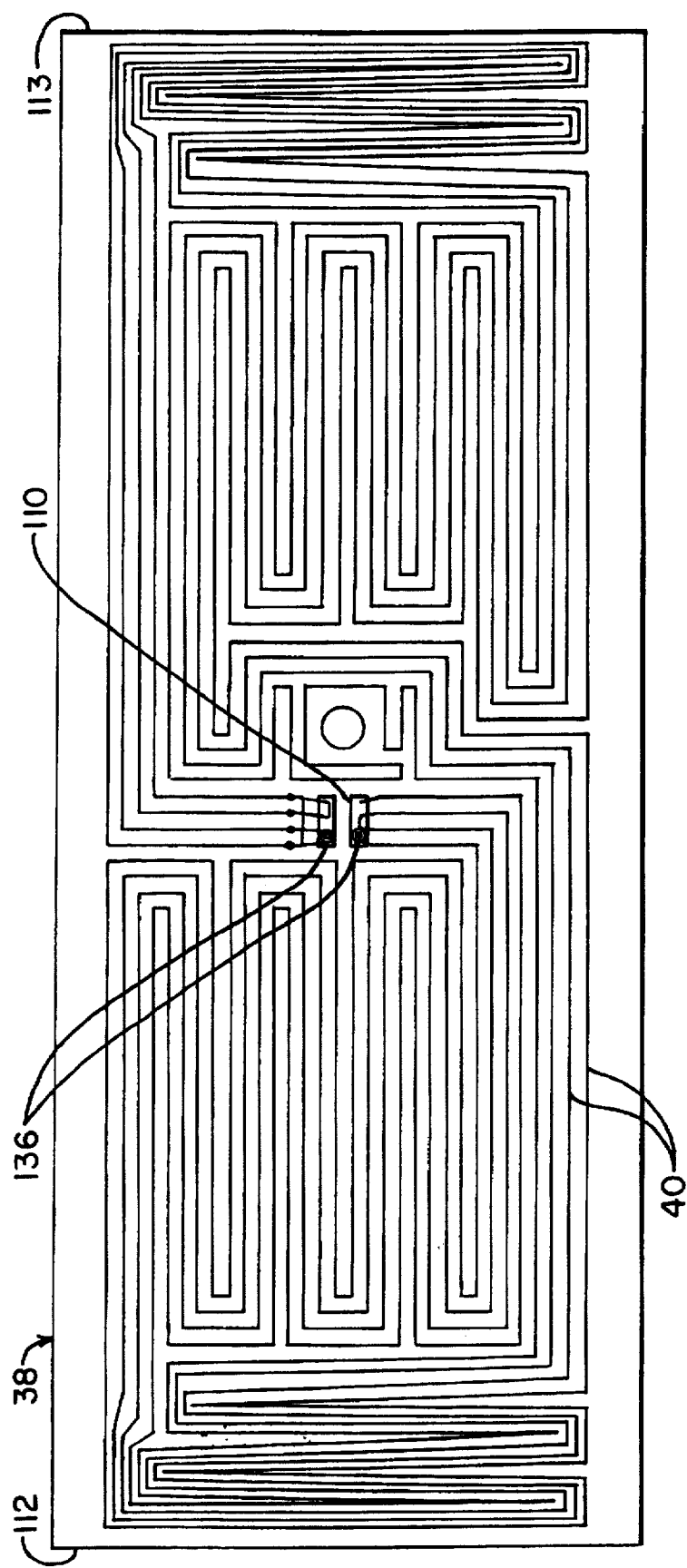
FIG. 18 shows another diagram of an alternate pattern for the wire heating element similar to FIG. 15, but with a higher density of the heating wire concentrated at opposite ends of the heater.

While the previous discussion has described two methods of vulcanizing the heater mat 34, other methods could also be used. For example, vacuum bagging techniques, pressure bag techniques, pressure bladder techniques, autoclaving, or other conventional vulcanization techniques could also be used to vulcanize the heater mat 34. The methods described above can also be used to manufacture heater mats having complex curvatures. It is well known in the art to make and use mandrels and/or platens for vulcanizing objects having complex curvatures. Typically, the mandrels have the shape and dimensions of the object that the heater is being made to surround and heat. For example, the pre-vulcanized heater mat 150 for the elbow-shaped heater 52 of FIG. 6 has the initial flat shape shown in FIG. 13 before it is wrapped onto the mandrel for vulcanization. The heater mat 150 is vulcanized on a mandrel (not shown) having approximately the same shape and configuration as the elbow pipe (not shown) on which it is to be mounted. Likewise, the heater mat 152 for the T-shaped heater 56 of FIG. 7 has the initial flat shape shown in FIG. 14 before it is wrapped onto the mandrel for vulcanization. The heater mat 152 is vulcanized on a mandrel (not shown) having approximately the same shape and configuration as the T-shaped pipe fitting (not shown) on which it is to be mounted. Similarly, the heater mat 154 for the valve heater 60 of FIG. 8 has the initial flat shape shown in FIG. 15 before it is wrapped onto the mandrel for vulcanization. The heater mat 154 is vulcanized on a mandrel (not shown) having approximately the same shape and configuration as the valve body (not shown) on which it is to be mounted. A heater mat 156 shown in FIG. 16 can also be manufactured for surrounding and heating a frustum shaped pipe (not shown) by using a frustum shaped mandrel (not shown). Other heater mats (not shown) having complex curvatures can be vulcanized using the appropriately shaped mandrels. In a similar fashion for the heater mat 120 for the elbow-shaped heater 52, Permacel #P5012 can be used for the heater mats 152, 154 in the heaters 56, 60, respectively, and to create the heater mats for other objects having complex curvature.

The wire heating element 40 can have any of a variety of patterns, such as the patterns shown in FIGS. 10–12, 17 and 18. The geometric wire pattern 300 shown in FIG. 17 has the wire heating element 40 arranged with a density that varies slightly over the surface area. The geometric wire pattern 302 of FIG. 18 has a wire density that increases from the center 110 of the heater mat 34 toward the longitudinal ends 112, 113, which is an example of the ability to apply different amounts of heat to different parts of the pipe P in FIG. 1. Applying different mounts of heat to different parts of the pipe P can be important when it is necessary to generate a specific temperature profile in the different areas of the pipe or to maintain uniform temperature profile where some locations have more heat dissipation or loss than others. This technique may also be used when, for example, more heat is needed in a given area of the pipe P to heat up a more massive attachment, such as a valve, flange, or boss, or to provide more heat at the areas of the pipe P such as, for example, the end of the pipe P or along the edge faces 42, 43 of insulation jacket 36, where greater heat loss is expected.

After the vulcanization of the heater mat 34 is finished, the jacket 36 of thermally insulative material is bonded to or foamed-in-place to the heater mat 34 using a transfer molding process or an injection molding process, both of which are described in more detail below.

The transfer molding process illustrated in FIG. 19 can be used for cylindrical heaters and is characterized by dispensing the foam insulation material into the lower half 158 of an open mold 159, then placing the upper half 160 of the mold 159 on top of the lower half 158 and allowing the foam insulation to "grow" in the mold 159. More specifically, the vulcanized heater mat 34 is positioned around a suitably sized and shaped forming mandrel 162 to hold its shape during molding and bonding of the jacket 36 of thermally insulative material to the heater mat 34. The mandrel 162 has a diameter approximately equal to the diameter of the pipe P or other object on which the heater is to be mounted. Both the mold 159 and the mandrel 162 can be made of, for example, aluminum. The heater mat 34 is placed on the mandrel 162 such that the eyelet electrical access points 136 of the wire heating element 40 are positioned in the heater mat 34 under the location 164 shown in phantom lines on the surface of the heater mat 34 in FIG. 19. The mold 159 is fabricated with a Teflon™ impregnated anodize coating, such as, for example, Nituff, provided by Nimet Industries, Inc., of Lafayette, Ind., to improve the hardness of the molding surfaces, the release of the foamed part from the mandrel 162 and the mold 159, and the clean up of the mandrel 162 and the mold 159. The internal surfaces of the mold 159 are sprayed with a mold release coating such as, for example, Slide #42612 Universal Release, manufactured by Percy Harms Corporation of Wheeling, Ill., to further improve the release of the foamed part from the mold 159 surfaces. The forming mandrel 162 and the heater mat 34 are then placed inside the lower half 158 of the mold 159.

As previously discussed, the thermally insulative material in the jacket 36 can be, for example, silicone sponge or foam rubber, polymer foam, epoxy foam, or polyurethane foam. Preferably, a silicone sponge or foam rubber is used, because it bonds well to the silicone solid rubber in the heater mat 34 surface and because silicone sponge or foam rubber can withstand a considerable amount of heat without being damaged as well as providing to optimum thermal conductance and compressibility modulus, coefficient of conduction, elasticity, density, and the like to achieve the shape memory and insulative qualities and features of this invention as described above. Optimally, a silicone sponge or foam rubber, such as RTF 7000 manufactured by General Electric Company of Waterford, N.Y., is used for these qualities. The foam insulation material is prepared by mixing methanol with a pigment material and a base material. Preferably, the pigment material is, for example, Ferro GV 47000 manufactured by Ferro Corporation of Plymouth, Ind., and the base material is the RTF 7000 silicone foam discussed above. The methanol is used to lower the density of the foam. The pigment material is used to pigment or colorize the foam to a rust color. The base material is the solid structure of the foam matrix. The methanol, pigment material, and base material are preferably mixed together in a ratio of one, one, one hundred (1:1:100) parts-by-weight, respectively. A metering machine (not shown) is then used to meter out the prepared base, pigment, and methanol mixture and to mix the mixture with a catalyst material in a ratio of ten to one (10:1) parts-by-weight of the base material to the catalyst material. Preferably, the catalyst material is, for example, RTF 7110 manufactured by General Electric Company. The catalyst material is used to react with the base, pigment, and methanol mixture to generate hydrogen gas which expands the base material and simultaneously cures the expanding base material into a foamed structure. A predetermined amount of the resulting unmixed material is dispensed into a paper cartridge (not shown). The unmixed material is mixed together in the paper cartridge for approximately thirty (30) seconds. After the material is mixed, the paper cartridge (not shown) is placed inside a pneumatic caulking gun (not shown), and the material is dispensed using the caulking gun (not shown) into the cavity area 166 of the lower half 158 of the mold 159 and around the heater mat 34 and the mandrel 162.

After the material is completely dispensed, the tipper half 160 of the mold 159 with the cavity area 168 is positioned and secured over the lower half 158 of the mold 159 so that the point A on the upper half 160 of the mold 159 is adjacent the point A' on the lower half 158 of the mold 159 and so that the point B on the upper half 160 of the mold 159 is adjacent the point B' on the lower half 158 of the mold 159. The upper half 160 of the mold 159 includes the control blockout 170 positioned inside the cavity area 168.

When the upper half 160 of the mold 159 is correctly positioned on the lower half 158 of the mold 159, the top surface 172 of the control blockout 170 is positioned at the dashed location 164 shown in phantom lines on the heater mat 34. The control blockout 170 forms the control cavity 115 (see FIG. 5) by preventing the foam material from curing and forming directly on that portion of the surface of heater mat 34 outlined by phantom lines 164 directly above the eyelet electrical access points 136 of the wire heating element 40. The foam material is then allowed to expand and rise for approximately twenty (20) minutes. As the foam material rises, it grows around the periphery of the heater mat 34 and fills the cavity 168 area in the upper half 160 of the mold 159. The area where the foam material meets as it expands and rises around the periphery of the heater mat is referred to as the "fusion line". The mold 159 prevents the foam material from leaking out of the cavity areas 166, 168 and helps shape the foam material so that it forms the tubular jacket 36 surrounding and bonded to the heater mat 34. Preferably, the cavity areas 166, 168 form a circular cross-section so that the resulting heater 30 will have a circular cross section. The mold structure 159 has to be quite substantial and the halves A and A' have to be very securely fastened together during this process, because the expanding or rising foam can build up significant internal pressures in the mold cavity 159.

After the rising is complete, the entire mold 159 is placed inside an oven (not shown) for approximately ten (10) minutes, or for the length of time it takes to get the surface of the molded heater 30 to a temperature of approximately fifty degrees celsius (50° C.). The entire mold 159 is then left to stand to cool before removing the heater 30 from the mandrel 162 and the mold 159. The mold 159 may be placed inside a refrigerator (not shown) to accelerate the cooling.

After cooling, the heater 30 is removed from the mold 159. As a result of the curing process, the jacket 36 of thermally insulative material does not contain the edge faces 42, 43 shown in FIG. 1. Therefore, a suitable cutting device (not shown) is used to cut or shear the jacket 36 of thermally insulative material so that the edge faces 42, 43 are formed. The heater 30 can then be removed from the mandrel 162.

The resulting cured silicone foam in the jacket 36 of thermally insulative material will have a density of approximately eighteen (18) to twenty (20) pounds-per-cubic foot. This density of the silicone sponge or foam rubber is desirable, because it produces a temperature on the outside surface 114 of the heater 30 that is less than seventy degrees celsius (70° C.) for a jacket 36 of thermally insulative material having a thickness of approximately one-half inch with the elasticity, compressibility, and other desirable qualities described above. Decreasing the density of the silicone sponge or foam rubber in the jacket 36 of thermally insulative material or increasing the thickness of the jacket 36 of thermally insulative material will reduce the outside surface 114 temperature of the heater 30.

The density of the silicone foam in the jacket 36 of thermally insulative material can be modified by the addition or reduction of methanol. For example, using 0.5 parts-by-weight of methanol in the mixture described above instead of the one (1) part-by-weight of methanol will create a silicone foam jacket 36 having a final part density of approximately thirty (30) pounds-per-cubic foot. Using 1.5 parts-by-weight of methanol in the mixture described above instead of the one (1) part-by-weight of methanol will create a silicone foam jacket 36 having a final part density of approximately ten (10) pounds-per-cubic foot.

Figure 20:
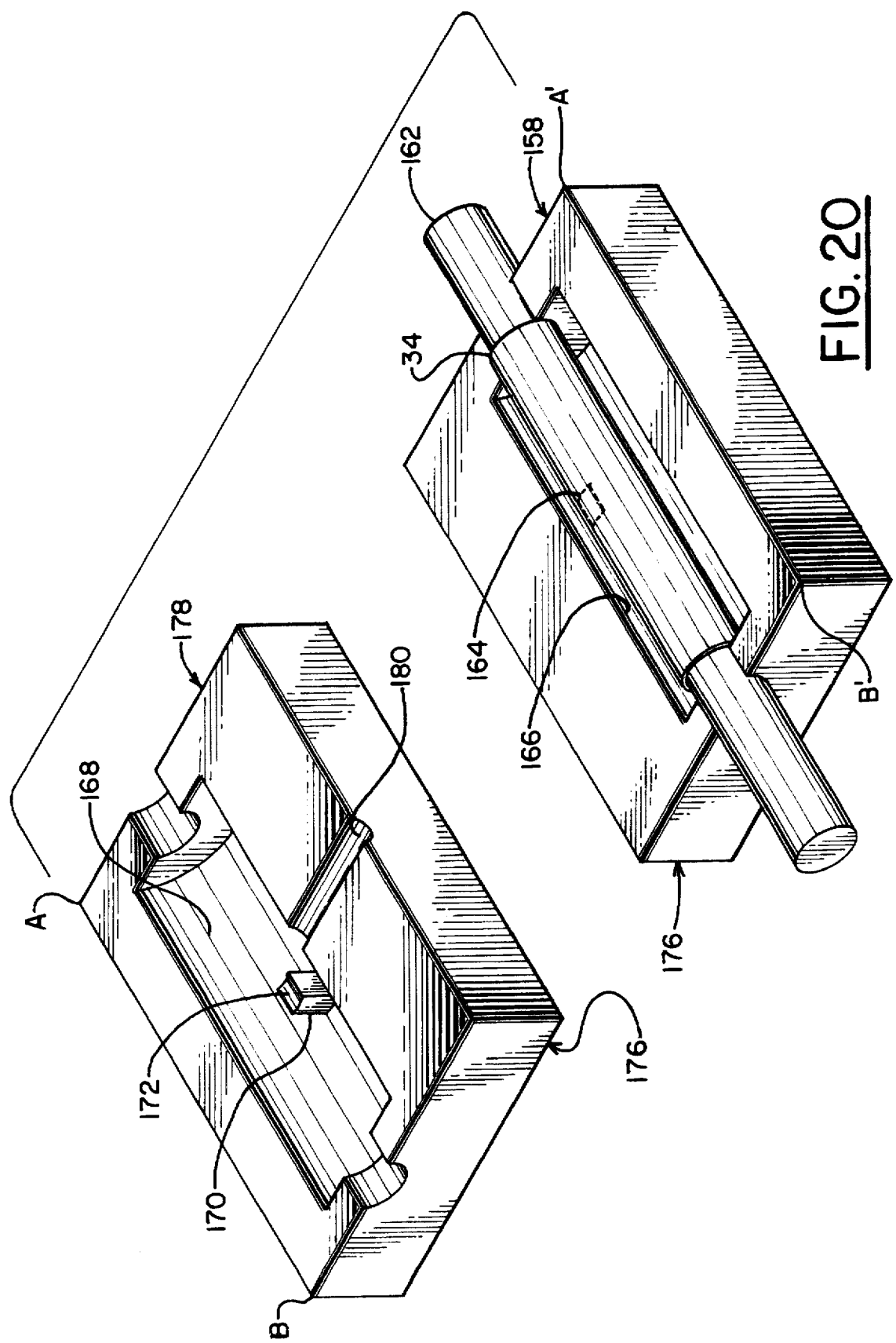
FIG. 20 is a diagrammatic, isometric view of the vulcanized heater mat wrapped around a mandrel in preparation for injection molding of thermally insulative material around the heater mat to form the flexible heater of FIG. 1.

The injection molding process illustrated in FIG. 20 can be used to fabricate heaters having complex curvatures, such as, for example, elbow-shaped heaters, and is characterized by the more classical style of molding where the mold is closed and has one injection port or fill hole where the silicone foam material is injected. More specifically, the initial steps of the injection molding process are similar to the initial steps of the transfer molding process described above. That is, the heater mat 34 is placed around the mandrel 162, which is then placed into the lower half 158 of the mold 176, as shown in FIG. 20. Prior to placing the mandrel 162 into the lower half 158 of the mold 176, the lower half 158 and the upper half 178 of the mold 176 are sprayed with a mold release. The upper half 178 of the mold 176 is then positioned on and secured to the lower half 158 of the mold 176. The foam mixture is then created using the same process described above for the transfer molding process.

The primary difference between the transfer molding process and the injection molding process is how the mixed material discussed above is dispensed into the mold. After the paper cartridge (not shown) containing the predetermined amount of mixed foam material is placed inside a pneumatic caulking gun (not shown), the material is dispensed using the caulking gun (not shown) through the fill port 180 in the upper half 178 of the mold 176 until the cartridge is empty. The mold 176 prevents the foam material from leaking out of the cavity areas 166, 168 during the injection molding process and shapes the foam material injected into the mold 176 so that it forms the tubular jacket 36 surrounding and bonded to the heater mat 34. The rising and curing of the foam material after injection is similar to that described above for the transfer molding process. As shown in FIG. 19-20, the cavity areas 166, 168 form a circular cross-section so that the resulting heater 30 will have a circular cross section.

One advantage of using the molding and foaming methods described above is that a heater 30 having a jacket 36 of almost any desired thickness can be formed and the heater 30 will still be able to be opened wide enough to be installed around a pipe while maintaining effective memory bias to its original molded curved shape. While the jacket 36 of thermally insulative material can have almost any desired thickness, preferably the jacket 36 has a thickness in the range of one-fourth inch to one inch in order to achieve the desired memory bias and thermal insulation properties described above and the desired temperature on the outside surface 114 of the heater 30. The desired thickness of the thermal insulating jacket 36 will vary according to the application in which the heater 30 used and desired temperature at which the pipe P is to be maintained. Another advantage of using the methods described above is that the resulting heater 30 is aesthetically attractive in appearance and color.

The final heater 30 created by the preferred method retains enough resilient flexibility so that it can be opened at the edge faces 42, 43 to accommodate installation around a pipe P, but snaps back into its vulcanized and molded shape upon release, as described above. The snaps 44 on the straps 46, hook and loop fasteners 35, 37, or other fasteners can be added to the outside surface 114 of the heater 30 to ensure that the heater 30 is secured around the pipe P and cannot be rubbed or knocked off inadvertently.

Figure 21:
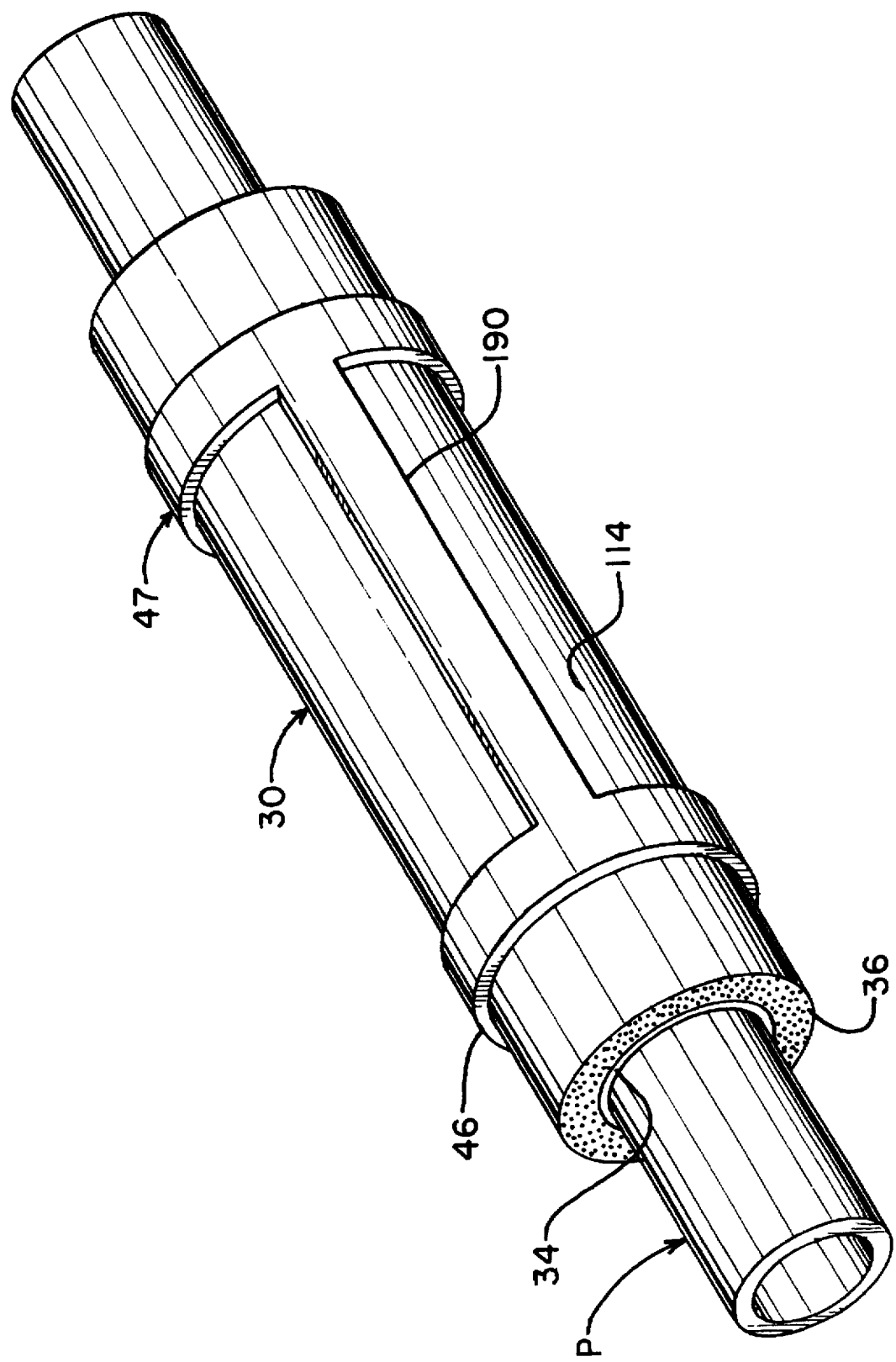
FIG. 21 shows an isometric view of the flexible insulated heater of FIG. 1 and the optional strap harness.

More specifically, the snaps 44 are plastic snap fasteners that are integrated into the straps 46 made out of Permacel #P5012 material that has been precut and vulcanized to be placed on the outside surface 114 of the heater 30. The straps 46 are bonded to the jacket 36 of thermally insulative material with an adhesive that is die cut to match the shape of the straps 46. Preferably, the adhesive is a platinum cure silicone such as, for example, Arlon #41400N030 manufactured by Arlon of Bear, Del. The bonding of the straps 46 to the jacket 36 of thermally insulative material is done at approximately 250° F. for approximately thirty (30) minutes. In a different embodiment shown in FIG. 21, the straps 46, 47 are part of a strap jacket 190 made out of Permacel #5012 material that has been precut and vulcanized to be place on the outside surface 114 of the heater 30. The strap jacket 190 is adhesive bonded to the jacket 36 of thermally insulative material as described above. The strap jacket 190 covers the control cavity 115 so that the thermal fuse 116, the thermostat 117, the optional monitor thermostat 121, and other electrical components are not exposed. If the strap jacket 190 is not used, the control cavity 115 can be covered by an appropriately sized section of Permacel #5012 that is precut, vulcanized, and adhesively bonded to the jacket 36 of thermally insulative material over and around the control cavity 115. The strap jacket 190 can also be used to cover all or a portion of the fusion line created during the molding process to improve the aesthetic or cosmetic appearance of the heater 30. In addition, strain relief for the power cords 48, 49 can be obtained by vulcanizing the sleeving of the power cords 48, 49 to the strap jacket 190.

The optional decorative overmold 50 can be attached to the strap jacket 190 or any other piece of Permacel #5012 material that has been adhesively bonded to the jacket 36 of thermally insulative material. The overmold 50 can also be attached to the sleeving of the power cords 48, 49 where the power cords 48, 49 pass through the overmold 50. The overmold 50 can comprise a liquid silicone rubber material such as, for example, LSR 950, manufactured by General Electric or Waterford, N.Y. While the overmold 50 is shown in FIGS. 1-4 extending radially outward from the jacket 36 of thermally insulative material, the overmold 50 can, in fact, be considerably smaller so that it does not extend significantly beyond the outside surface 114 of the heater 30 or the strap jacket 190.

During operation and use of the heater 30, the heater 30 is installed around the pipe P and the power cord 48 is plugged into an electrical outlet (199) or other power supply (not shown) so that current can flow through the wire heating element 40 to generate heat. It is possible that the power cord 48 will have as much as twelve (12) amps of current flowing through it. The heat generated by the heater mat 34 in the heater 30 is thermally conducted to the pipe P to heat the pipe P.

Figure 22:
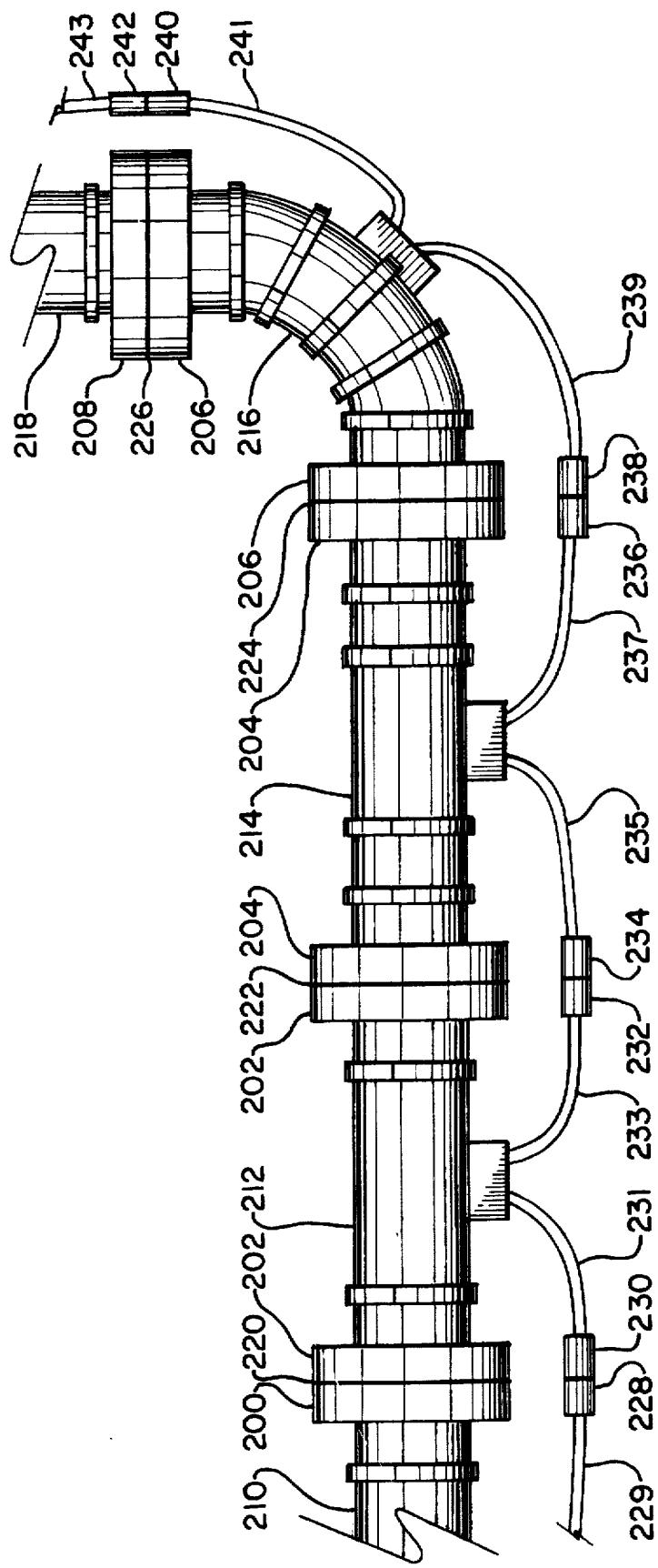
FIG. 22 shows an elevation view of a system of heaters, including the cylindrical heater of FIG. 1 and the elbow heater of FIG. 6.

A significant feature of the present invention is that a system of heaters can be daisy chained together to surround and heat a network of pipes as shown in FIG. 22. The five pipe segments 200, 202, 204, 206, 208 are surrounded and heated by the heaters 210, 212, 214, 216, 218, respectively. The pipe segments 200, 202 are connected at the flange interface 220. The pipe segments 202, 204 are connected at the flange interface 222. The pipe segments 204, 206 are connected at the flange interface 224. The pipe segments 206, 208 are connected at the flange interface 226. The connections between the pipe segments 200, 202, 204, 206, 208 at the flange interfaces 220, 222, 224, 226 can be done by welding, bolting, or other suitable methods or equipment that are well-known to persons skilled in the industrial piping art.

Figure 23:
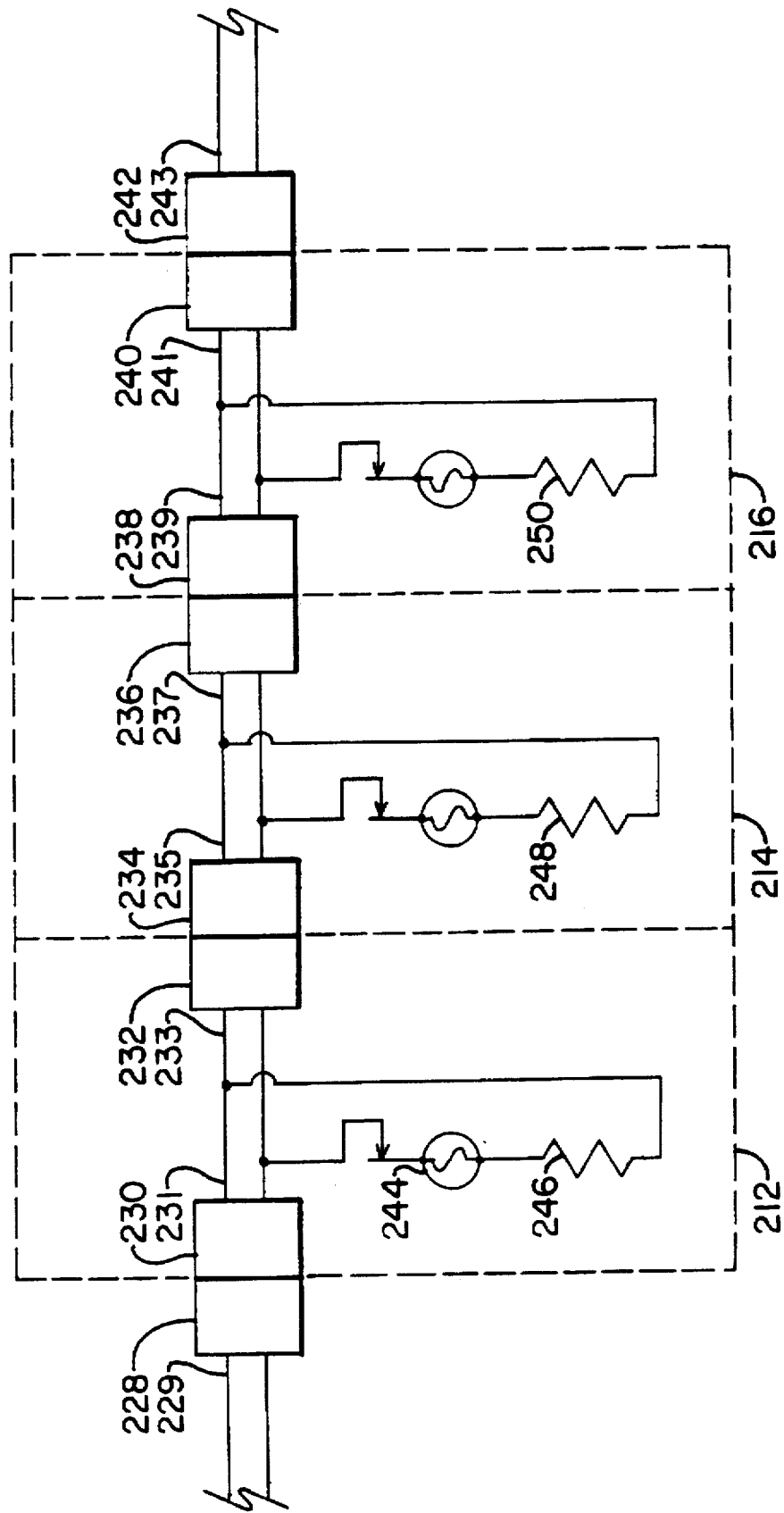
FIG. 23 shows a schematic diagram of the electric circuitry of the heaters shown in FIG. 22.

In the daisy chain arrangement of the heaters 210, 212, 214, 216, 218, the male plug end 228 on the power cord 229 of the heater 210 is plugged into the female plug end 230 on the power cord 231 of the heater 212. The male plug end 232 on the power cord 233 of the heater 212 is plugged into the female plug end 234 on the power cord 235 of the heater 214. The male plug end 236 on the power cord 237 of the heater 214 is plugged into the female plug end 238 on the power cord 239 of the heater 216 and the male plug end 240 on the power cord 241 on the heater 216 is plugged into the female plug end 242 on the power cord 243 of the heater 218. Each of the heaters 210, 212, 214, 216, 218 have electric circuits and configurations similar to the electric circuit shown in FIG. 9 for the heater 20 discussed above, including the thermal fuse 116 and the optional thermostat 117. In addition, each of the heaters 210, 212, 214, 216, 218 can include the optional monitor thermostat 121 shown in FIG. 9 and the plugs 123, 125 for the optional monitor thermostat 121 can also be daisy chained together. For simplicity purposes, the plugs 123, 125 and the optional thermostat 121 are not illustrated in FIGS. 22 and 23.

The daisy chain capability of the heaters, as illustrated in FIG. 22, allows a long series of heaters to be connected together, while significantly reducing the number of electrical current carrying wires needed to supply the heaters with electrical current. The reduction in the number of electric wires can provide a benefit of fewer obstacles for personnel working in the vicinity of the piping network, particularly if the piping network is extensive and requires a large number of heaters. In addition, the parallel connection design of the electric circuitry shown in FIG. 9, which is illustrated connected to a plurality of similar circuits daisy chained together in FIG. 23, allows one or more heaters to malfunction while maintaining the current supplied to the remaining heaters. For example, if the fuse 244 in FIG. 23 in the heater 212 were to blow, malfunction, or otherwise sever the electrical current pathway for the wire heating element 246, electrical current would stop flowing through the wire heating element 246 in the heater 212. Electrical current would still flow, however, through the wire heating element 248 in the heater 214 and through the wire heating dement 250 in the wire heating element 216.

The foregoing description is considered as illustrative only of the principles of the invention. Furthermore, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims which follow.

The embodiments of the invention in which an exclusive property or privilege is claimed are defined as follows:

1. Heater apparatus, comprising:
a heater mat including a heat producing material in a flexible, but substantially unstretchable solid material matrix that has a first edge and a second edge with an inner surface extending between said first edge and said second edge and an outer surface spaced radially outward from the inner surface and extending between said first edge and said second edge with the solid material matrix separating the outer surface spatially from the inner surface, said mat being formed in a shape that wraps said inner surface around a space, which space has a periphery that is defined by said inner surface, said first edge and said second edge being in substantially juxtaposed relation to each other; and
a jacket formed around and bonded in immoveable relation to the outer surface of the heater mat, said jacket comprising a resiliently stretchable and compressible material containing cells of gas dispersed throughout a matrix of solid material, wherein said material is less dense, more elastic, more compressible, less thermally conductive, and thicker in cross-sectional dimension than said heater mat and is resiliently resistive to both compression set and compression to a sufficient extent that said material yields and strains in compression to accommodate separation of said first edge and said second edge from each other as an external force is applied to move said first edge and said second edge apart from each other and then returns to and maintains said first edge and said second edge in substantially juxtaposed relation to each other after removal of such external force.

2. The heater apparatus of claim 1, wherein said material has a compression modulus in a range between firm defined as 10 to 40 lbs/in.$^2$ when compressed 15 to 45% and soft defined as 1 to 30 lbs/in.$^2$ when compressed 15 to 70%.

3. The heater apparatus of claim 2, wherein said composite material comprises silicone sponge or foam rubber.

4. The heater apparatus of claim 3, wherein said material has a coefficient of thermal conductivity in a range between 0.06 watts/meter-K and 0.12 watts/meter-K.

5. The heater apparatus of claim 4, wherein said jacket comprising said composite material is greater than one-fourth inch in thickness.

6. The heater apparatus of claim 4, wherein said jacket comprising said material has a thickness in a range between one-fourth inch and one inch thick.

7. The heater apparatus of claim 4, wherein said jacket comprising said composite material is about one-half inch thick.

8. The heater apparatus of claim 2, wherein said solid material matrix includes a fiberglass reinforced silicone solid rubber.

9. The heater apparatus of claim 8, wherein said heat producing material includes an electrically resistive wire embedded in said fiberglass reinforced silicone solid rubber.

10. The heater apparatus of claim 9, wherein said heater mat is less than two millimeters (2 mm) thick.

11. The heater apparatus of claim 1, wherein said composite material comprises silicone sponge or foam rubber.

12. The heater apparatus of claim 11, wherein said material has a coefficient of thermal conductivity in a range between 0.06 watts/metero-K and 0.12 watts/meter-K.

13. The heater apparatus of claim 12, wherein said material has an exposed peripheral surface spaced radially outward from the outer surface of said heater mat and said material has a thickness such that when the inner surface of said heater mat has a temperature of 200° C., said exposed peripheral surface of said material will have a temperature less than or equal to 75° C.

14. Heater apparatus for heating an object that has a curved surface in two or three dimensions, comprising:
a thin, flexible heater mat comprised of fiberglass reinforced silicone solid rubber with an inner surface and an outer surface, said outer surface being spaced radially outward from said inner surface by a thickness of said flexible heater mat, and including an electrically powered heating element embedded in said fiberglass reinforced solid rubber between said inner surface and said outer surface, said inner surface having a size and shape that conforms to an object having a curved surface; and a thermal insulative jacket comprising silicone sponge or foam rubber, which has a thickness greater than the thickness of the flexible heater mat, molded, cured, and bonded to the outer surface of the flexible heater mat when said inner surface is in said size and shape that conforms to the curved surface of the object such that said silicone sponge or foam rubber has a configuration with a set molecular structure that is elastic, but resilient and biased to said configuration sufficiently such that said silicone sponge or foam rubber returns and maintains said inner surface of the heater mat to and conforming with the curved surface of the object when there is no external force on the heater that deforms the inner surface of the heater mat radially outward away from the curved surface of the object, said silicone sponge or foam rubber having an exposed peripheral surface spaced radially outward from the outer surface of the heater mat by a spatial distance equal to the thickness of the silicone sponge or foam rubber, said silicone sponge or foam rubber also being more resistive to heat conduction than said heater mat and having a thickness such that a 200° C. temperature at said inner surface of said heater mat attenuates to less than 75° C. at said peripheral surface in a room temperature ambient environment, and further wherein after said jacket is bonded to said heater mat, said heater mat and said jacket form interfacing edge faces and a slit such that said heater mat and said jacket are attachable to and removable from the object when external forces are applied to said heater mat and said jacket.

15. Heater apparatus for heating an object that has a curved surface in two or three dimensions, the heater apparatus being fabricated by a process comprising the steps of:

forming a thin, flexible, but unstretchable heater mat by positioning an electric heater element between two partially cured, fiberglass reinforced, silicone solid rubber sheets; wrapping the two sheets with the electric heater element positioned therebetween around a mandrel that has a surface substantially identical in size and shape to an object having a curved surface; and simultaneously applying both radially inward directed pressure and heat to the two sheets and electric heating element wrapped around the mandrel to vulcanize the two sheets together into a unitary heater mat of fiberglass reinforced silicone solid rubber with the electric heater element embedded therein;

removing the heat and pressure from the heater mat;

forming an insulative, structure-enhancing jacket around the heater mat by positioning the heater mat still on the mandrel into a mold cavity that has a peripheral size and shape larger than the heater mat on the mandrel; mixing a base silicone rubber material with a catalyst that reacts with the base to generate gas, which expands the base material and simultaneously cures the expanding base material into a sponge or foam structure; partially filling the mold cavity around the heater element and mandrel with the mixture of base silicone rubber material, and catalyst; allowing the base material to expand, cure, and bond around the outer surface of the heater mat on the mandrel in the mold cavity until the mold cavity is filled with expanded silicone sponge or foam structure; heating the silicone sponge or foam structure in the mold cavity to cure and then allow the silicone sponge or foam structure to cool; removing the cured structure of silicone sponge or foam from the mold cavity; and slitting the structure to create a slit or split in the silicone sponge or foam structure with juxtaposed edge faces that can be forced radially apart against an inherent resilient bias of the structural combination of the heater mat and jacket to remove the structure from the mandrel.

16. The heater apparatus fabricated by the process of claim 15, wherein the step of applying radially inward directed pressure and heat to said two sheets and said electric heater element wrapped around said mandrel includes the steps of wrapping a band of stretchable and heat shrinkable material around the outer of said two sheets and said mandrel at room temperature and then heating said band, said mandrel, said electric heater element, and said two sheets such that said band shrinks and applies a radially inward directed pressure to said two sheets and said electric heater element.

17. The heater apparatus fabricated by the process of claim 16, wherein said band, said mandrel, said electric heater element, and said two sheets are heated to a temperature of approximately 325° F. for approximately thirty minutes.

18. The heater apparatus fabricated by the process of claim 17, wherein said band shrinks such that it applies a radially inward directed pressure in a range between ten to fifteen pounds-per-square-inch (PSI) to said two sheets and said electric heater element.

19. The heater apparatus fabricated by the process of claim 15, wherein the step of applying radially inward directed pressure and heat to said two sheets and said electric heater element includes the steps of placing said mandrel, said two sheets, and said electric heater element into a heatable platen having a plurality of portions and pressing said portions of said heatable platen onto the outer of said two sheets.

20. The heater apparatus fabricated by the process claim 19, wherein said portions of said platen are pressed onto said two sheets at a pressure of approximately twenty-five pounds-per-square inch (PSI).

21. The heater apparatus fabricated by the process of claim 20, wherein said mandrel and said platen are heated to a temperature of approximately 350° F. for approximately ten minutes.

22. The heater apparatus fabricated by the process of claim 15, including the step of mixing said base material with a pigment material before said base material is mixed with said catalyst material and including the step of mixing methanol with said base material and said catalyst material when said base material is mixed with said catalyst material.

23. The heater apparatus fabricated by the process of claim 22, wherein said methanol, said pigment material, and said base material are mixed together in a ratio of approximately one, one, one-hundred (1:1:100) parts-by-weight, respectively.

24. The heater apparatus fabricated by the process of claim 23, wherein said catalyst is mixed with said mixture of methanol, pigment material, and base material in ratio of approximately ten-to-one (10:1) parts-by-weight of said base material to said catalyst, respectively.

25. The heater apparatus fabricated by the process of claim 15, wherein the step of mixing said base silicone rubber material with said methanol and said catalyst includes mixing said methanol, said base material, and said catalyst at a ratio of approximately one, one-hundred, ten (1:100:10) parts-by-weight, respectively.

26. The heater apparatus fabricated by the process of claim 15, including the step of forming a control cavity in said jacket such that a portion of said outer surface of said heater mat is not surrounded by said jacket.

27. The heater apparatus fabricated by the process of claim 26, including the step of positioning a blockout in said mold cavity disposed between said outer surface of said heater mat on said mandrel and an inside surface of said mold cavity such that said control cavity is formed when said material expands, cures, and bonds around said outer surface of said heater mat on said mandrel in said mold cavity.

28. The heater apparatus fabricated by the process of claim 26, including the step of attaching an electric cord to said electric heater element in said control cavity.

29. The heater apparatus fabricated by the process of claim 28, including the step of filling said control cavity with an encapsulative material.

30. The heater apparatus fabricated by the process of claim 26, including the steps of positioning an electrical device having a first pole and a second pole inside said control cavity and electrically connecting said first pole of said electrical device to said electric heater element and said second pole of said electrical device to an electric cord that extends out of said control cavity.

31. The heater apparatus fabricated by the process of claim 30, wherein said electrical device includes a thermostat.

32. The heater apparatus fabricated by the process of claim 30, wherein said electrical device includes a fuse.

33. A method for creating a heater apparatus for heating an object where the object has a curved surface in two dimensions or three dimensions, comprising the steps of:

positioning an electric heater element between two partially cured, fiberglass reinforced, silicone solid rubber sheets;

wrapping said two sheets with said electric heater element positioned there between around a mandrel that has a surface substantially identical in size and shape to an object having a curved surface;

simultaneously applying both radially inward directed pressure and heat to said two sheets and said electric heating element wrapped around said mandrel to vulcanize said two sheets together into a unitary heater mat with fiberglass reinforced silicone solid rubber having with said electric heater element embedded therein, wherein said unitary heater mat has an inner surface adjacent said mandrel and an outer surface spaced radially outward from said inner surface;

removing said heat and said pressure from said heater mat;

positioning said heater mat while still on said mandrel into a mold cavity that has a peripheral size and shape larger than said heater mat on said mandrel;

mixing a base silicone rubber material with methanol and a catalyst that reacts with said base material to generate gas to expand said base material and simultaneously cure said expanding base material into a silicone sponge or foam structure;

partially filling said mold cavity around said heater mat and said mandrel with said mixture of base silicone rubber material, methanol, and catalyst;

allowing said mixture to expand, cure and bond around the outer surface of said heater mat on said mandrel in said mold cavity until said mold cavity is filled with expanded silicone sponge or foam structure surrounding said heater mat;

heating said silicone sponge or foam structure in said mold cavity to cure said silicone sponge or foam structure;

allowing said cured silicone sponge or foam structure in said mold cavity to cool such that an insulative, structure-enhancing jacket is formed around said heater mat;

removing said mandrel with said heater mat and said jacket from said mold cavity; and slitting said heater mat and said jacket to create a slit or split in said heater mat and said jacket having juxtaposed edge faces that can be forced apart against an inherent resilient bias of the structural combination of said heater mat and said jacket to remove the structure from said mandrel.

34. The method of claim 33, wherein the step of applying radially inward directed pressure and heat to said two sheets and said electric heater element wrapped around said mandrel includes the steps of wrapping a band of stretchable and heat shrinkable material around the outer of said two sheets and said mandrel at room temperature and then heating said band, said mandrel, said electric heater element, and said two sheets such that said band shrinks and applies a radially inward directed pressure to said two sheets and said electric heater element.

35. The method of claim 34, wherein said band, said mandrel, said electric heater element, and said two sheets are heated to a temperature of approximately 325° F. for approximately thirty minutes.

36. The method of claim 35, wherein said band shrinks such that it applies a radially inward directed pressure in a range between ten to fifteen pounds-per-square-inch (PSI) to said two sheets and said electric heater element.

37. The method of claim 33, wherein the step of applying radially inward directed pressure and heat to said two sheets and said electric heater element includes the steps of placing said mandrel, said two sheets, and said electric heater element into a heatable platen having a plurality of portions and pressing said portions of said heatable platen onto the outer of said two sheets.

38. The method of claim 37, wherein said portions of said platen are pressed onto said two sheets at a pressure of approximately twenty-five pounds-per-square inch (PSI).

39. The method of claim 38, wherein said mandrel and said platen are heated to a temperature of approximately 350° F. for approximately ten minutes.

40. The method of claim 33, including the step of spraying said mold cavity with a mold release coating before said mandrel is placed inside said mold cavity.

41. The heater apparatus of claim 2, wherein said jacket contains a cavity such that a portion of said heater mat is not surrounded by or connected to said jacket.

42. The heater apparatus of claim 41, wherein said heat producing material includes an electric resistive wire element embedded in said solid material matrix, an electric cord is electrically connected to said electric resistive wire element in said cavity, and said electric cord extends outward from said heater apparatus.

43. The heater apparatus of claim 42, wherein said cavity is filled with an encapsulative material.

44. The heater apparatus of claim 41, wherein said heat producing element includes an electric resistive wire element embedded in said solid material matrix, an electrical device having a first pole and a second pole is positioned inside said cavity, said first pole of said electrical device being electrically connected to said electric resistive wire element and said second pole of said electrical device being electrically connected to an electric cord that extends out of said cavity.

45. The heater apparatus of claim 44, wherein said electrical device includes a thermostat.

46. The heater apparatus of claim 44, wherein said electrical device includes a fuse.

47. The heater apparatus of claim 1, including a strap jacket comprising a flexible, but substantially unstretchable, solid material matrix with an inner surface that is sized and shaped to substantially surround and conform to an outer surface of said jacket.

48. A heater assembly, comprising:

a plurality of heater apparatuses, each heater apparatus including:

a heater mat including a heat producing material in a flexible, but substantially unstretchable solid material matrix that has a first edge and a second edge with an inner surface extending between said first edge and said second edge and an outer surface spaced outward from the inner surface and extending between said first edge and said second edge with the solid material matrix separating the outer surface spatially from the inner surface, said mat being formed in a shape that wraps said inner surface around a space, which space has a periphery that is defined by said inner surface, said first edge and said second edge being in substantially juxtaposed relation to each other, further wherein said heat producing material in each heater apparatus in the heater assembly is connectable in electrical parallel to the heat producing material of each other heater mat in the heater assembly and is electrically connectable to a source of electric power; and a jacket formed around and bonded in immoveable relation to the outer surface of the heater mat, said jacket comprising a resiliently stretchable and compressible material containing cells of gas dispersed throughout a matrix of solid material, wherein said material is less dense, more elastic, more compressible, less thermally conductive, and thicker in cross-sectional dimension than said heater mat and is resiliently resistive to both compression set and compression to a sufficient extent that said material yields and strains in compression to accommodate separation of said first edge and said second edge from each other as an external force is applied to move said first edge and said second edge apart from each other such that said heater apparatus returns to and maintains said first edge and said second edge in substantially juxtaposed relation to each other after removal of such external force.

49. The heater assembly of claim 48, including an interconnecting electric circuit through which said heat producing materials are electrically connected to each other in electrical parallel and connectable to said source of electric power.

50. The heater assembly of claim 49, wherein each said heat producing material includes a first pole and a second pole and wherein said interconnecting electric circuit includes electrical conductors that connect the first pole of each of said heater assemblies with the first pole of each of the other heater assemblies and that connect the second pole of each of said heater assemblies with the first pole of each of the other heater assemblies to connect said heat producing materials of each heater assembly in electrical parallel.

51. The heater assembly of claim 50, wherein said electrical circuit comprises a plurality of connectable segments, each of said segments being positioned adjacent a respective individual heater apparatus and enclosing a portion of said electrical conductors, and wherein said first pole and said second pole of the heat producing material in each heater apparatus are electrically connected to the respective portions of the electrical conductors that are in a respective adjacent segment.

52. The heater assembly of claim 51, wherein each electrical conductor in each of said segments terminates at one end in a respective first terminating plug and at an opposite end in a respective second terminating plug and wherein the first terminating plug of each of said segments is electrically connectable alternatively to said source of electric power or to a second terminating plug of another one of said segments.

53. The heater assembly of claim 52, wherein a first terminating plug in one segment is connected to the source of electric power and said conductors in the one segment provide electrical power to the second terminating plug of the one segment such that a first terminating plug in another segment that is connected to said second terminating plug in said one segment is connected to said source of electric power.

54. A method for fabricating a heater apparatus for heating an object where the object has a curved surface in two dimensions or three dimensions, comprising the steps of:

positioning an electric heater element between two partially cured, fiberglass reinforced, silicone solid rubber sheets;

wrapping said two sheets with said electric heater element positioned there between around a mandrel that has a surface substantially identical in size and shape to an object having a curved surface;

simultaneously applying both radially inward directed pressure and heat to said two sheets and said electric heating element wrapped around said mandrel to vulcanize said two sheets together into a unitary heater mat of fiberglass reinforced silicone solid rubber with said electric heater element embedded therein;

removing said heat and said pressure from said heater mat;

positioning said heater mat while still on said mandrel into a mold cavity that has a peripheral size and shape larger than said heater mat on said mandrel;

mixing a base silicone rubber material with a catalyst that reacts with said base to generate gas to expand said base material and simultaneously cure said expanding base material into a silicone sponge or foam structure;

partially filling said mold cavity around said heater mat and said mandrel with said mixture of base silicone rubber material and catalyst;

allowing said mixture to expand, cure and bond around the outer surface of said heater mat on said mandrel in said mold cavity until said mold cavity is filled with expanded silicone sponge or foam structure surrounding said heater mat;

allowing said cured silicone sponge or foam structure in said mold cavity to cool such that an insulative, structure-enhancing jacket is formed around said heater mat;

removing said mandrel with said heater mat and said jacket from said mold cavity; and slitting said heater mat and said jacket to create a slit or split in said heater mat and said jacket having juxtaposed edge faces that can be forced apart against an inherent resilient bias of the structural combination of said heater mat and said jacket to remove the structure from said mandrel.

55. A method for fabricating a heater apparatus for heating an object where the object has a curved surface in two dimensions or three dimensions, comprising the steps of:

creating a unitary heater mat of fiberglass reinforced silicone solid rubber that has a first surface and a second surface and includes an electric heater element enclosed substantially within said fiberglass reinforced silicone solid rubber;

wrapping said unitary heater mat around a mandrel, wherein said mandrel has an surface substantially identical in size and shape to an object having a curved surface, such that said first surface of said unitary heater mat is adjacent said surface of said mandrel;

positioning said unitary heater mat while still wrapped around said mandrel into a mold cavity that has a peripheral size and shape larger than said unitary heater mat on said mandrel;

mixing a base silicone rubber material and a catalyst that reacts with said base material to generate gas to expand said base material and simultaneously cure said expanding base material into a silicone sponge or foam structure;

partially filling said mold cavity around said unitary heater mat and said mandrel with said mixture of base silicone rubber material and catalyst;

allowing said mixture of base silicone rubber material and catalyst to expand, cure and bond around said second surface of said unitary heater mat on said mandrel in said mold cavity until said mold cavity is filled with expanded silicone sponge or foam structure surrounding said unitary heater mat;

allowing said cured silicone sponge or foam structure in said mold cavity to cool such that an insulative, structure-enhancing jacket is formed around said unitary heater mat;

removing said mandrel with said unitary heater mat and said jacket from said mold cavity; and slitting said unitary heater mat and said jacket to create a slit or split in said unitary heater mat and said jacket having juxtaposed edge faces that can be forced apart against an inherent resilient bias of the structural combination of said unitary heater mat and said jacket to remove said structural combination from said mandrel.

\* \* \* \* \*